(12) United States Patent
Chaubey et al.

(10) Patent No.: US 11,303,575 B2
(45) Date of Patent: Apr. 12, 2022

(54) NETWORK TRAFFIC CONTROL BASED ON APPLICATION FEATURE

(71) Applicant: Juniper Networks, Inc., Sunnyvale, CA (US)

(72) Inventors: Rajeev Chaubey, Bangalore (IN); Sravanthi Arimanda, Bangalore (IN); Ashok Kumar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/829,690

(22) Filed: Mar. 25, 2020

(65) Prior Publication Data

US 2021/0306276 A1 Sep. 30, 2021

(51) Int. Cl.
*H04L 12/859* (2013.01)
*H04L 47/2475* (2022.01)

(52) U.S. Cl.
CPC .................. *H04L 47/2475* (2013.01)

(58) Field of Classification Search
CPC .................................................. H04L 47/2475
See application file for complete search history.

(56) References Cited

U.S. PATENT DOCUMENTS

| | | | | |
|---|---|---|---|---|
| 7,882,554 B2* | 2/2011 | Kay | ............ | H04L 63/1416 726/11 |
| 7,890,991 B2* | 2/2011 | Kay | ............ | H04L 63/1416 726/1 |
| 8,024,799 B2* | 9/2011 | Kay | ............ | H04L 63/1416 726/22 |
| 8,346,918 B2* | 1/2013 | Kay | ............ | H04L 63/1416 709/224 |

(Continued)

FOREIGN PATENT DOCUMENTS

| | | | | |
|---|---|---|---|---|
| CN | 108023860 | A | * | 5/2018 |
| CN | 110120934 | A | * | 8/2019 ......... H04L 41/0806 |
| EP | 1839160 | A2 | | 10/2007 |

OTHER PUBLICATIONS

Gaolei Li et al. "Deep Packet Inspection based Application-Aware Traffic Control for Software Defined Networks", 2016 IEEE Global Communications Conference (GLOBECOM), Washington, D.C., USA, Dec. 2016, 6 pages. (Year: 2016).*

(Continued)

*Primary Examiner* — George C Neurauter, Jr.
(74) *Attorney, Agent, or Firm* — Harrity & Harrity, LLP

(57) ABSTRACT

A network device may receive network traffic associated with a network and determine that the network traffic is associated with a dynamic application. The network device may determine, based on the network traffic being associated with a dynamic application, an application feature associated with the network traffic. The network device may perform a lookup operation associated with the application feature to identify policy information associated with the application feature. The network device may selectively permit communication of the network traffic via the network based on the policy information associated with the application feature, wherein the network traffic is to be permitted to be communicated via the network or prevented from being communicated via the network based on an indication from the policy information.

20 Claims, 10 Drawing Sheets

(56) References Cited

U.S. PATENT DOCUMENTS

| | | | |
|---|---|---|---|
| 8,509,071 B1* | 8/2013 | Narayanaswamy | H04L 47/20 370/230 |
| 8,612,612 B1* | 12/2013 | Dukes | H04L 67/141 709/228 |
| 8,665,868 B2* | 3/2014 | Kay | H04L 63/1416 370/389 |
| 8,724,633 B2* | 5/2014 | Yu | H04L 63/0245 370/392 |
| 9,252,972 B1* | 2/2016 | Dukes | H04L 45/64 |
| 9,288,290 B2* | 3/2016 | Natarajan | H04L 69/22 |
| 9,450,768 B2* | 9/2016 | Soderlund | H04W 8/18 |
| 9,667,653 B2* | 5/2017 | Barabash | H04L 41/0893 |
| 10,063,519 B1* | 8/2018 | Zhao | H04L 63/20 |
| 10,069,704 B2* | 9/2018 | Kay | H04L 43/0876 |
| 2010/0172257 A1* | 7/2010 | Yu | H04L 63/0245 370/252 |
| 2011/0231924 A1* | 9/2011 | Devdhar | H04L 63/1416 726/11 |
| 2013/0077491 A1 | 3/2013 | Cherian et al. | |
| 2015/0071129 A1* | 3/2015 | Soderlund | H04W 8/18 370/259 |
| 2015/0156086 A1* | 6/2015 | Chesla | H04L 43/04 709/224 |
| 2016/0088001 A1* | 3/2016 | Yeh | H04L 43/026 726/23 |
| 2017/0317978 A1 | 11/2017 | Diaz-Cuellar et al. | |
| 2019/0037015 A1* | 1/2019 | Hunt | H04L 67/1055 |
| 2019/0116148 A1* | 4/2019 | Senftleber | H04L 51/063 |
| 2019/0132289 A1* | 5/2019 | Hulick, Jr. | H04L 63/0245 |

OTHER PUBLICATIONS

Ep. "Deep packet inspection is dead, and here's why", Institute for Advanced Study, Network Security, originally posted Jun. 2, 2017, publicly retreived Jan. 15, 2019, 2 pages. (Year: 2017).*

Karen Scarfone et al. "Guidelines on Firewall and Firewall Policy", National Institute of Standards and Technology, Recommendations of the National Institute of Standards and Technology, Special Publication 800-41, Revision 1, Sep. 2009, 48 pages. (Year: 2009).*

VMware. "Add an NSX Edge Firewall Rule", last updated Sep. 2, 2019, 8 pages. (Year: 2019).*

VMware. "NSX Administration Guide", VMware NSX Data Center for vSphere 6.4, Update 4, 2018, 493 pages. (Year: 2018).*

Juniper Networks. "Security Director User Guide", last modified Mar. 22, 2017, 720 pages. (Year: 2017).*

Extended European Search Report for Application No. EP20175183.1, dated Sep. 29, 2020, 9 pages.

* cited by examiner

200

210
Application Feature-Based Policy Mapping

Application 1

| Application Feature | Action |
|---|---|
| Chat | Allow |
| Social Media | Deny |
| Audio Streaming | Deny |
| ... | ... |

220
Feature Type-Based Policy Mapping

Application Feature 1

| Application | Action |
|---|---|
| ABC App | Allow |
| DEF App | Deny |
| XYZ App | Deny |
| ... | ... |

FIG. 2A

NETWORK TRAFFIC CONTROL BASED ON APPLICATION FEATURE

BACKGROUND

A network device, such as a firewall or other security device, of a network may be used to allow or block network traffic associated with the network. For example, the network device may use a set of policies to block or allow network traffic sent to the network, network traffic sent from the network, and/or network traffic sent within the network.

SUMMARY

According to some implementations, a method may include receiving, by a network device, network traffic associated with a network; determining, by the network device, that the network traffic is associated with a dynamic application; determining, by the network device and based on determining that the network traffic is associated with a dynamic application, an application feature associated with the network traffic; performing, by the network device, a lookup operation associated with the application feature to identify policy information associated with the application feature; and selectively permitting, by the network device, communication of the network traffic via the network based on the policy information associated with the application feature, wherein the network traffic is to be communicated via the network when the policy information indicates that the network traffic associated with the application feature is permitted to be communicated via the network, or wherein the network traffic is to be prevented from being communicated via the network when the policy information indicates that the network traffic associated with the application feature is to be prevented from being communicated via the network.

According to some implementations, a network device may include one or more memories; and one or more processors configured to: receive network traffic associated with a network, wherein the network traffic is associated with an application; determine that the application is a dynamic application; determine, based on determining that the application is a dynamic application, an application feature associated with the network traffic; obtain, from a policy mapping, policy information associated with the application feature, wherein the policy mapping identifies policies that apply to a plurality of applications for application features that are permitted to be communicated or that are to be prevented from being communicated; determine, based on the policy information, whether communication of the network traffic is permitted via the network; and perform, based on whether communication of the network traffic is permitted via the network, an action associated with the network traffic.

According to some implementations, a non-transitory computer-readable medium may store one or more instructions. The one or more instructions, when executed by one or more processors, may cause the one or more processors to: monitor a session that is associated with a network; determine that network traffic of the session is associated with an application feature; determine, based on policy information associated with the application feature, whether the network traffic is permitted to be communicated via the network; and perform, based on whether the network traffic is determined to be permitted to be communicated, an action associated with communication of the network traffic.

BRIEF DESCRIPTION OF THE DRAWINGS

FIGS. 2A and 2B are diagrams of one or more example implementations described herein.

DETAILED DESCRIPTION

Figure 1A:
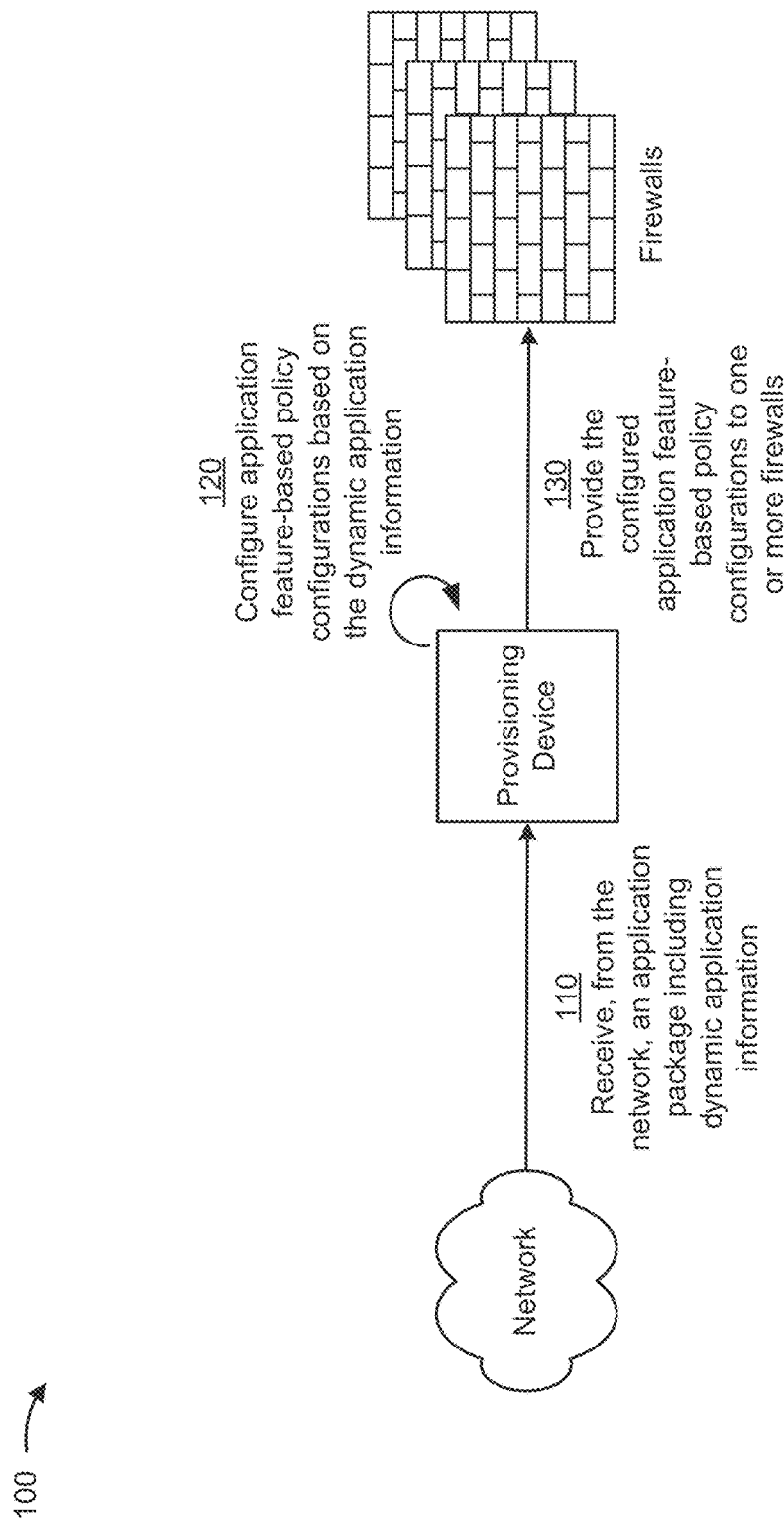
FIGS. 1A and 1B are diagrams of one or more example implementations described herein.

The following detailed description of example implementations refers to the accompanying drawings. The same reference numbers in different drawings may identify the same or similar elements.

A firewall may be used to allow deny, rate limit, or enforce other actions on network traffic based on a policy implemented by the firewall and one or more characteristics of the network traffic. For example, the firewall may use a policy to allow or deny network traffic for an application. However, in some instances, such a policy can cause the firewall to cause all network traffic associated with the application to be allowed or denied. As such, the firewall may have to allow all network traffic associated with an application or allow no network traffic associated with the application. Such an all-or-nothing application-based policy may waste computing resources (e.g., processing resources, memory resources, communication resources, and/or the like) and/or network resources associated with transmitting network traffic associated with the application that should have been prevented from being communicated on a network and/or preventing network traffic associated with the application that should have been permitted to be communicated on the network.

Some implementations described herein provide a firewall that is configured with a more granular policy than the all-or-nothing application-based policy. The firewall may be configured with one or more policies for application feature-specific traffic (e.g., specific to a particular feature of an application) and/or feature type-specific traffic (e.g., independent of which application is associated with the network traffic). For example, the firewall may utilize an application feature-based policy (rather than an application-based policy) that permits or denies network traffic of a particular application based on a feature associated with network traffic of the particular application (e.g., permit or deny network traffic of a chat feature of application ABC). Additionally, or alternatively, the firewall may utilize a feature type-based policy (rather than an application-based policy) that permits or denies network traffic of an application feature for all applications that have that application feature (e.g., permit or deny network traffic of a chat feature regardless of the application that has the chat feature).

The firewall may identify an application feature for network traffic of an application (e.g., of a session of an application). The firewall may identify (e.g., in a packet communicated in association with establishing the session) the application and a corresponding application feature of the network traffic. In such a case, if the network traffic is to be allowed according to an application feature-based policy and/or a feature type-based policy (e.g., if the application feature-based policy and/or the feature type-based policy indicates that this type of network traffic is permitted or no application feature-based policy and/or the feature type-based policy indicates that this type of network traffic is to be denied), the firewall may permit the network traffic to be communicated. Alternatively, if the network traffic is to be denied according to an application feature-based policy and/or a feature type-based policy (e.g., if the application feature-based policy and/or the feature type-based policy indicates that this type of network traffic is to be denied), the firewall may drop and/or prevent communication of the network traffic.

In this way, the firewall provides a more granular policy for handling network traffic associated with an application. The firewall (and/or a network device associated with the firewall) conserves resources (e.g., computing resources and/or network resources) that would have otherwise been used to prevent communication of network traffic that would be permitted based on an application feature-based policy and/or a feature type-based policy. Additionally, or alternatively, the firewall (and/or a network device associated with the firewall) conserves resources (e.g., computing resources and/or network resources) that would have otherwise been used to permit and provide communication of network traffic that would be prevented based on an application feature-based policy and/or a feature type-based policy.

Figure 1B:
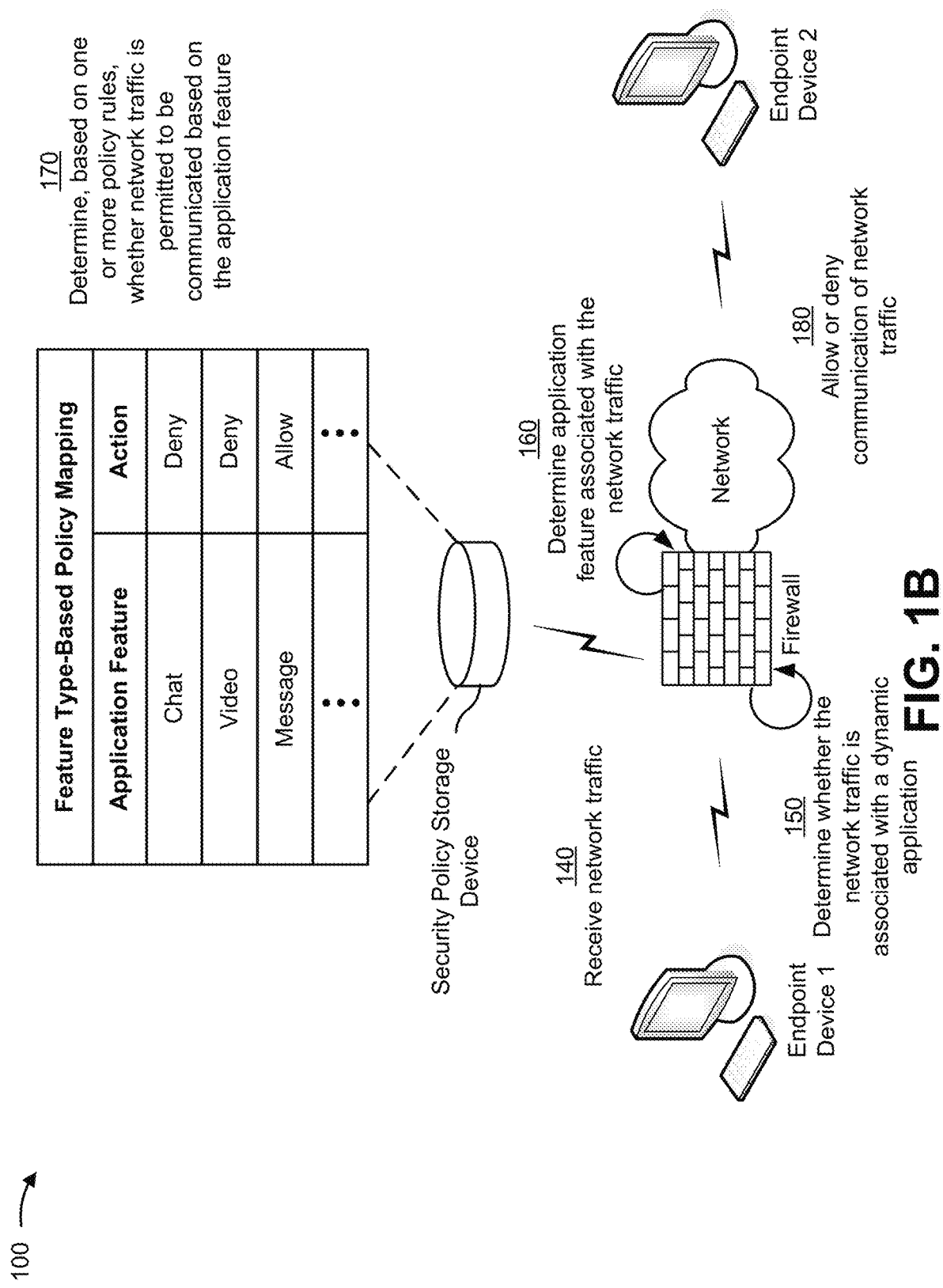

FIGS. 1A and 1B are diagrams of one or more example implementations 100 described herein. As shown in FIG. 1A, the example implementation(s) 100 may include a provisioning device that receives communications over a network and one or more firewalls associated with the provisioning device. The one or more firewalls may be associated with one or more network devices (e.g., a firewall may be a network device or may be included within a network device) that manage communication (or a flow) of network traffic to a network, from a network, and/or within a network. In some implementations, the one or more firewalls may be capable of performing one or more (or all) of the functions described herein with respect to the provisioning device.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As shown in FIG. 1A, and by reference number 110, the provisioning device may receive, from the network, one or more application packages. The application packages may include dynamic application information associated with one or more dynamic applications. A dynamic application is an application that is capable of communicating, at any given time, any one or more of a plurality of types of network traffic that are associated with a plurality of types of different application features (e.g., an application that is capable of communicating network traffic associated with a plurality of application features). An application feature may be a capability and/or a function associated with an application, such as a chat (e.g., messaging, instant messaging, and/or the like) feature, a secure message feature, a media stream (e.g., audio stream, video stream, multimedia stream, and/or the like) feature, a voice communication feature, a media download feature, a media upload feature, an interactive feature, a tunneled traffic feature (e.g., a tunneling protocol, an encapsulation protocol, and/or the like), a social media feature, and/or the like. The dynamic application may obtain variable policy enforcement based on the application feature associated with the network traffic of the application.

The dynamic application information may identify a dynamic application. In some implementations, the dynamic application information includes an application identifier associated with the dynamic application. The application identifier may enable a firewall to identify the dynamic application and/or to identify that the dynamic application is a dynamic application. The application identifier may be a character string, a signature, a pattern, a rule, a stateful protocol analysis, and/or the like that can be used to identify the dynamic application.

Additionally, or alternatively, the dynamic application information may include an application feature identifier associated with the one or more application features that are associated with the dynamic application. The application feature identifier may enable a firewall to identify the application feature associated with the application feature identifier. The application feature identifier may be a character string, a signature, a pattern, a rule, a stateful protocol analysis, and/or the like that can be used to identify the application feature.

As an example, the provisioning device may receive an application package including dynamic application information. The application package may be received by the provisioning device from an application. An application may periodically (e.g., when the application is updated, when the application transmits network traffic, and/or the like) transmit an application package associated with the application to the provisioning device. In some implementations, the provisioning device may receive an application package from a computing device associated with the network. In some implementations, the provisioning device may request an application package from an application and/or from a computing device associated with the network. In some implementations, the provisioning device may receive a plurality of application packages at the same time. The provisioning device may download one or more application packages from a device (such as a server device) associated with the network.

In some implementations, the application package may be stored by the provisioning device. The application package may be stored in a data structure, such as a table, a list (e.g., a structured list sorted by application, an unstructured list, and/or the like), an index (e.g., that indexes the application information based on the application), a graph, and/or the like. In some implementations, the application package may be stored in the provisioning device. Additionally, or alternatively, the application package may be stored by the provisioning device in another device (such as a server device) associated with the provisioning device.

As further shown in FIG. 1A, and by reference number 120, the provisioning device may configure application feature-based policy configurations based on the dynamic application information. The application feature-based policy configurations may include a list of dynamic applications, a list of application features, and/or policy rules (e.g., application feature-based policy rules and/or feature type-based policy rules).

The provisioning device may receive the application package via the network. The provisioning device may analyze the application package to determine the contents of the application package. For example, the application package may include dynamic application information associated with an application, such as an application identifier associated with the application, an indication of whether the application is designated as a dynamic application, one or more application features associated with the application, an application feature identifier associated with an application feature, and/or the like.

The provisioning device may compile a list of dynamic applications based on contents of one or more application packages. The list of dynamic applications may be a list (e.g., a structured list sorted by application and/or by application identifier, an unstructured list, and/or the like), an index (e.g., that indexes the information based on the application), a mapping, a graph, and/or the like. The application package may include an application identifier associated with an application and, explicitly or implicitly, an indication that the application is designated as a dynamic application. The application package may explicitly include an indication that the application is designated as a dynamic application by including, within the contents of the application package, one or more bits that are set to indicate that the application is designated as a dynamic application. The application package may implicitly include an indication that the application is designated as a dynamic application by including, within the contents of the application package, the application identifier associated with the application (e.g., the mere presence of the application identifier within the contents of the application package indicates that the application is designated as a dynamic application). The provisioning device may create an entry in the list of dynamic applications corresponding to the application based on the indication that the application is designated as a dynamic application. The entry may include the application identifier associated with the application. The list of dynamic applications may be stored by the provisioning device.

The provisioning device may compile and/or update the list of dynamic applications based on receiving an application package that includes an indication that an application is a dynamic application. The provisioning device may determine, based on the contents of the application package, that the application package includes an indication that an application is a dynamic application. The provisioning device may determine, based on the contents of the application package, an application identifier corresponding to the application indicated as a dynamic application. The provisioning device may access the list of dynamic applications and search for the application identifier corresponding to the application indicated as a dynamic application. If the provisioning device determines, based on the search, that the list of dynamic applications does not include an entry that is associated with the application identifier corresponding to the application indicated as a dynamic application, the provisioning device may create a new entry that is associated with the application identifier corresponding to the application indicated to be a dynamic application. Creating the new entry in the list of dynamic applications may result in an updated list of dynamic applications. The updated list of dynamic applications may be stored by the provisioning device. In this way, the list of dynamic applications stored by the provisioning device may include all dynamic applications (with each dynamic application identified by an application identifier corresponding to the dynamic application) known by the provisioning device.

The provisioning device may compile a list of application features. The list of application features may be a list (e.g., a structured list sorted by application feature and/or by application feature identifier, an unstructured list, and/or the like), an index (e.g., that indexes the information based on the application feature and/or based on an application associated with the application feature), a mapping, a graph, and/or the like. The contents of the application package may include one or more application features associated with the application (with each application feature being associated with an application feature identifier). The provisioning device may create an entry in the list of application features corresponding to each application feature identified in the application package. The entry may include the application feature and/or the application feature identifier associated with the application feature. The list of application features may be stored by the provisioning device.

The provisioning device may compile and/or update the list of application features based on receiving an application package that one or more application features associated with the application (with each application feature being associated with an application feature identifier). The provisioning device may determine, based on the contents of the application package, an application feature associated with the application. The provisioning device may determine, based on the contents of the application package, an application feature identifier associated with the application feature. The provisioning device may access the stored list of application features and search for the application feature and/or search for the application feature identifier. If the provisioning device determines, based on the search, that the list of application features does not include an entry corresponding to the application feature and/or to the application feature identifier, the provisioning device may create a new entry that includes the application feature and the associated application feature identifier, resulting in an updated list of application features. The updated list of application features may be stored by the provisioning device. In this way, the list of dynamic applications stored by the provisioning device includes all application features (with each entry corresponding to an application feature including the application feature identifier associated with the application feature) known by the provisioning device.

The provisioning device may receive instructions relating to one or more application features and/or one or more applications to be included in one or more policy rules to be configured by the provisioning device. The instructions may relate to an application feature that is to be denied, such as by preventing network traffic associated with the application feature from being communicated by one or more firewalls associated with the network (e.g., resulting in a feature-type based policy). Additionally, or alternatively, the instructions may relate to an application feature of a specific application that is to be denied, such as by preventing network traffic associated with the application feature and the specific application from being communicated by one or more firewalls associated with the network (e.g., resulting in an application feature-based policy). Additionally, or alternatively, the instructions may relate to an exempt application corresponding to an application feature that is to be denied, such as by permitting network traffic associated with the application feature and the exempt application to be communicated and preventing network traffic associated with the application feature and all other applications from being communicated by one or more firewalls associated with the network.

The instructions may be received by the provisioning device from a device associated with an operator of the network, such as a network administrator. The operator of the network may define, in the instructions provided by the device associated with the operator, an application feature (e.g., application feature A, regardless of the application) that is to be prevented from being communicated by a firewall associated with the network. The operator of the network may define, in the instructions provided by the device associated with the operator, an application feature of a specific application (e.g., application feature 123 of application ABC) that is to be prevented from being communicated by a firewall associated with the network.

The provisioning device may provide the list of dynamic applications and/or the list of application features to the device associated with the operator of the network. The operator may define the instructions based on the list of dynamic applications and/or the list of application features. The device associated with the operator of the network may provide options corresponding to the entries of the list of dynamic applications and/or the entries of the list of application features to the operator of the network which can be selected (e.g., via user input received by the device associated with the operator of the network) by the operator to be included in the policy rules.

The instructions may be received by the provisioning device from a device (such as a server device, a cloud computing platform, and/or the like) that automatically determines the applications and/or the application features to be included in the policy rules. The device may determine the applications and/or the application features to be included in the policy rules by analyzing (e.g., via deep packet inspection (DPI), using machine learning, and/or the like) a plurality of historical network traffic to identify threats (e.g., malware, malicious activity, and/or the like) associated with an application and/or associated with an application feature. If the device determines there is a threat associated with an application and/or associated with an application feature, the device may provide instructions to the provisioning device to include the identified application and/or the identified application feature in the policy rules. For example, the instructions received by the provisioning device from the device may indicate that the identified application and/or application feature is to be prevented from being communicated by a firewall associated with the network, based on the threat associated with the identified application and/or the identified application feature.

For example, the device may analyze, via DPI, using machine learning, and/or the like, historical sets of network traffic that are associated with an application feature. The device may determine, based on the analysis, that the historical sets of network traffic that are associated with the application feature should be prevented from being communicated via the network. For example, the device may determine that the historical sets of network traffic included malicious activity. The device may designate, in the instructions provided to the provisioning device, the application feature for policy enforcement (e.g., provide instructions that indicate that the application feature should be included in the policy rules as a feature type-based policy rule).

In some implementations, the device may determine, based on the analysis of the historical sets of network traffic, that an application feature should be prevented from being communicated via the network only when the application feature is associated with a specific application. The device may designate, in the instructions provided to the provisioning device, the application feature and the application for policy enforcement (e.g., provide instructions that indicate that the application feature when associated with the application should be included in the policy rules as an application feature-based policy rule).

The provisioning device may generate policy rules based on the instructions received by the provisioning device. The provisioning device may generate application feature-based policy rules and/or feature-type based policy rules based on the instructions. A policy rule may include policy information. Policy information is information that can be used to define the network traffic that the policy rule applies to and define how a firewall is to handle the network traffic that the policy rule applies to. For example, policy information may identify a source zone of the network traffic (e.g., internal to the network, external to the network, and/or the like), a destination zone of the network traffic (e.g., internal to the network, external to the network, and/or the like), a source address associated with the network traffic (such as an IP address), a destination address associated with the network traffic (such as an IP address), a user associated with the network traffic, a port associated with the network traffic, a dynamic application associated with the network traffic (e.g., which application(s) the policy information applies to), an application feature associated with the network traffic (e.g., which application feature(s) the policy information applies to), an application feature exempt list associated with the policy rule (e.g., identifying an application and/or an application feature that is exempt from the policy established by the policy rule), an action to be performed by a firewall (e.g., a policy enforcement action), and/or the like.

The policy information may define the policy enforcement action to be performed by a firewall. The policy enforcement action may be one or more actions associated with allowing the network traffic to be communicated (e.g., permitting the network traffic to be communicated, forwarding the data communication and/or network traffic, blocking or dropping the data communication and/or network traffic, flagging (e.g., notifying a network administrator) and permitting the data communication and/or network traffic, flagging (e.g., notifying a network administrator) and blocking or dropping the data communication and/or network traffic, and/or the like). Additionally, or alternatively, the policy enforcement action may be one or more other actions associated with communication of network traffic. For example, the policy enforcement action may set parameters for communication of network traffic via the network. Such parameters may include a data rate, a usable bandwidth for communication of the network traffic, timing parameters (e.g., time limits, scheduling, and/or the like) associated the network traffic, and/or the like.

An application feature-based policy rule may define a policy rule for specific application features associated with an application. The application feature-based policy rule may define a policy enforcement action for network traffic associated with one or more application features that are associated with the application. For example, the application feature-based policy rule may define a first policy enforcement action for a first application feature associated with the application. The application feature-based policy rule may define a second policy enforcement action for a second application feature associated with the application. The application feature-based policy rule may apply only to network traffic that is associated with the application and the application feature designated in the application feature-based policy rule.

A feature type-based policy rule may define a policy rule that applies to one or more application features. The feature type-based policy rule may define a policy enforcement action for network traffic associated with an application feature, regardless of the application associated with the network traffic. In some implementations, the feature type-based policy rule may identify an exempt application. The feature type-based policy rule may define a policy enforcement action for the exempt application that is different than the policy enforcement action associated with all other applications under the feature type-based policy rule.

In some implementations, the provisioning device may configure the policy rules generated by the provisioning device in a policy mapping. The policy mapping may include one or more (or all) of the policy rules generated by the provisioning device. The policy mapping may be a list of policy rules, a table of policy rules, an index of policy rules, and/or the like. The policy mapping may include an entry that includes a policy rule. The entry may include policy information associated with the policy rule. The entry may include an application feature identifier associated with an application feature that is identified in the policy rule. The entry may include an application identifier associated with an application that is identified in the policy rule.

In some implementations, an entry associated with a feature type-based policy rule associated with an application feature may include a generic identifier. The generic identifier may indicate that the policy information included in the entry applies to network traffic that is associated with the application feature independent of which application(s) is/are associated with the application feature.

As further shown in FIG. 1A, and by reference number 130, the provisioning device may provide the configured application feature-based policy configurations (e.g., including the list of dynamic applications, the list of application features, and/or the policy rules generated by the provisioning device) to one or more firewalls. In some implementations the provisioning device may provide the list of dynamic applications, the list of application features, and/or the policy rules (e.g., in one or more policy mappings) to a firewall that is implemented within the provisioning device. In some implementations, the provisioning device may transmit the list of dynamic applications, the list of application features, and/or the policy rules to a plurality of firewalls that are associated with the provisioning device.

In some implementations, the list of dynamic applications, the list of application features, and/or the policy rules may be installed by a firewall. The firewall may store the list of dynamic applications, the list of application features, and/or the policy rules in a security policy storage device associated with the firewall. In some implementations, when the firewall receives the list of dynamic applications, the list of application features, and/or the policy rules, the firewall may replace a stored list of dynamic applications, a stored list of application features, and/or stored policy rules with the received list of dynamic applications, the received list of application features, and/or the received policy rules.

In some implementations, the provisioning device may include one or more modules. A first module may be enabled to configure the list of dynamic applications, the list of application features, and/or the policy rules, as described above. A second module may be enabled to enforce network traffic received from the network based on the list of dynamic applications, the list of application features, and/or the policy rules, as described below with respect to FIG. 1B. The first module may provide the list of dynamic applications, the list of application features, and/or the policy rules to the second module. The second module may receive, store, and/or use the list of dynamic applications, the list of application features, and/or the policy rules. In this case, the second module may be implemented within a firewall of the provisioning device.

The provisioning device may provide the list of dynamic applications, the list of application features, and/or the policy rules to a firewall periodically (e.g., once every hour, once per day, once per week, and/or the like), in real time, when a request for the list of dynamic applications, the list of application features, and/or the policy rules is received from the firewall, when a request is received from a device associated with an operator of the network to provide the list of dynamic applications, the list of application features, and/or the policy rules to the firewall, when a new policy rule is generated by the provisioning device, when the firewall is established and/or begins operation, and/or the like. In some implementations, the provisioning device may provide the list of dynamic applications, the list of application features, and/or the policy rules to the one or more firewalls when a change is made to the list of dynamic applications, the list of application features, and/or the policy rules (e.g., application feature-based policy rules and/or feature-type based policy rules) by the provisioning device.

As shown in FIG. 1B, the one or more example implementations 100 may include a first endpoint device (shown as "Endpoint Device 1"), a second endpoint device (shown as "Endpoint Device 2"), a network, a firewall, and a security policy storage device (e.g., a data structure that stores configured application feature-based policy configurations, such the list of dynamic applications, the list of application features, and/or the policy rules provided by the provisioning device). As shown, the security policy storage device includes policy information and may be implemented within the firewall and/or communicatively coupled with the firewall. In some implementations, the security policy storage device may be associated with a same device (e.g., the provisioning device) as the firewall. In some implementations, the list of dynamic applications, the list of application features, and/or the policy rules stored by the security policy storage device may be provided by the provisioning device.

In some implementations, the firewall may be implemented within, or otherwise associated with, the first endpoint device. In some implementations, the firewall may be implemented within, or otherwise associated with, the second endpoint device. In some implementations, the firewall may be partially implemented within, or otherwise associated with, the first endpoint device and the second endpoint device. The first endpoint device and the second endpoint device may be communicatively coupled via the network. Accordingly, in order for the first endpoint device to transmit a data communication to the second endpoint device, the firewall may be configured to allow the data communication to pass through the network to the send endpoint device.

As described herein, the first endpoint device and/or the second endpoint device may host and/or run an application that is involved in a session. Accordingly, the first endpoint device and/or the second endpoint device, in association with the session, may transmit a data communication and/or network traffic associated with the session. As described in connection one or more example implementations 100, the firewall may allow or deny the communication of such network traffic via the network (e.g., based one or more policies, such as the policy rules received from the provisioning device).

As further shown in FIG. 1B, and by reference number 140, the firewall may receive network traffic. For example, the network traffic may be associated with a session (e.g., an application session, a communication session, and/or the like) that involves communicating network traffic via the network. The network traffic may include one or more data communications of messages, protocol data units (PDUs) (e.g., packets or other units of data), and/or the like. In some implementations, the firewall may receive network traffic associated with an application (e.g., a computer program, a mobile application, an online application, a cloud-based application, and/or the like). The application may be a dynamic application. In some implementations, the network traffic may be associated with one or more applications.

In some implementations, the network traffic includes a plurality of communications (e.g., a plurality of messages, PDU transmissions, and/or the like) that facilitate a session involving the first endpoint device and the second endpoint device. For example, the first endpoint device may send network traffic via the network for the session, and/or the second endpoint device may correspondingly reply with network traffic for the session (or vice versa). Accordingly, the firewall may receive and/or intercept the network traffic to determine whether the network traffic and/or the session associated with the network traffic is permitted to be communicated via the network (e.g., according to one or more policy rules).

In some implementations, the network traffic may be associated with an application feature. The application feature may be associated with different types of network traffic, such as chat (e.g., instant messaging, messaging, real-time text transmission, and/or the like) traffic, video traffic, secure message traffic (e.g., secure sockets layer (SSL) traffic, transport layer security (TLS) traffic, opportunistic TLS traffic (e.g., STARTTLS negotiated traffic and/or the like), and/or the like), media stream (e.g., audio stream, video stream, and/or the like) traffic, voice communication (e.g., video communication, audio communication, and/or the like) traffic, media download traffic, media upload traffic, interactive traffic, tunneled traffic (e.g., network traffic sent via a tunneling protocol, an encapsulation protocol, and/or the like), social media traffic (e.g., traffic associated with interactions with a social media platform, such as likes, shares, comments, replies, and/or the like), forum traffic (e.g., traffic associated with interactions with an online forum), and/or the like. In some implementations, the network traffic may be associated with one or more application features.

As further shown in FIG. 1B, and by reference number 150, the firewall may determine whether the network traffic is associated with a dynamic application. The firewall may analyze a payload and/or header of the network traffic (e.g., via DPI, deep content inspection, stateful packet inspection, and/or the like) to identify an application identifier of an application associated with the network traffic. In some implementations, the firewall may identify the application identifier of the application associated with the network traffic without using DPI, deep content inspection, or stateful packet inspection. In some implementations, the application identifier may be included in a header of the network traffic that may be accessed without performing DPI, deep content inspection, or stateful packet inspection.

The firewall may search the list of dynamic applications for an entry that includes the application identifier that was identified based on the analysis of the network traffic. In some implementations, the firewall may perform a lookup operation that involves scanning the list of dynamic applications stored by the security policy storage device to determine whether the application associated with the network traffic is a dynamic application. The firewall may identify an entry that includes the application identifier (e.g., by performing the lookup operation and/or the search of the list of dynamic applications). The firewall may determine that, based on the application identifier being included in an entry of the list of dynamic applications, that the network traffic is associated with a dynamic application and/or that the session is associated with a dynamic application.

In this way, the firewall may determine whether to enforce network traffic (e.g., based on whether the application is designated as a dynamic application) based on the policy rules before performing additional analysis. For example, an application that is not designated as a dynamic application would not be enforced based on the policy rules (e.g., the application feature-based policy rules and/or the feature type-based policy rules) as there may not be an application feature associated with a non-dynamic application. The firewall may identify an application as a non-dynamic application and apply a different policy to the non-dynamic application. As such, determining whether to enforce network traffic based on the application feature-based policy at this point conserves computing resources and/or network resources that would have otherwise been used to process and/or analyze network traffic associated with a non-dynamic application.

As further shown in FIG. 1B, and by reference number 160, the firewall may determine an application feature associated with the network traffic. In some implementations, an application feature associated with network traffic may be predefined and identified in the network traffic. For example, the network traffic may include an application feature identifier in a header of the network traffic. Additionally, or alternatively, the firewall may determine the application feature by analyzing (e.g., via DPI, deep content inspection, stateful packet inspection, and/or the like) a payload and/or a header of the network traffic to identify an application feature identifier associated with the network traffic. In some implementations, the firewall may determine that there is a plurality of application feature identifiers associated with the network traffic.

The firewall may search the list of application features for an entry that includes the application feature identifier that was identified based on the analysis of the network traffic. In some implementations, the firewall may determine the application feature associated with the network traffic by performing a lookup operation that involves scanning the list of application features stored by security policy storage device to determine the application feature associated with network traffic.

In some implementations, the firewall may identify the application feature based on identifying an entry included in the list of application features that includes the application feature identifier (e.g., by performing the lookup operation and/or searching the list of application features for the application feature identifier). The firewall may determine the application feature from an entry in the list of application features that includes the application feature identifier. The firewall may determine, based on the application feature identifier and the corresponding entry in the list of application features, the application feature associated with the network traffic.

In some implementations, the firewall may not search the list of application features. The firewall may identify the application feature identifier and search and/or locate (e.g., using the application feature identifier) one or more policy rules that apply to the application feature associated with the application feature identifier.

In some implementations, to identify the application feature, the firewall may monitor a session and analyze payloads of a plurality of communications of the session to identify a particular set of communications. An application feature may be associated with one of the particular set of communications. The firewall may determine the application feature associated with one of the particular set of communications by analyzing (e.g., via DPI, deep content inspection, stateful packet inspection, and/or the like) the one of the particular set of communications and determining the application feature associated with the one of the particular set of communications in the same (or similar) manner described above.

In some implementations, network traffic may be associated with a plurality of application features. The firewall may identify each application feature associated with the network traffic.

As further shown in FIG. 1B, and by reference number 170, the firewall may determine, from one or more policy rules (e.g., application feature-based policy rules and/or feature type-based policy rules), whether network traffic is permitted to be communicated based on an application feature associated with the network traffic and/or based on the application feature and the application associated with the network traffic. Accordingly, using policy information (e.g., information that can be used to define the network traffic that the policy rule applies to and define how a firewall is to handle the network traffic that the policy rule applies to) included in one or more policy rules, the firewall may determine whether network traffic associated with the session is permitted to be communicated via the network.

Upon receipt of the network traffic, determination that the network traffic is associated with a dynamic application, and/or determination of an application feature of network traffic, the firewall may determine an appropriate policy rule to apply to the network traffic. For example, the firewall may perform a lookup operation (e.g., a lookup in a policy mapping) that involves scanning the security policy storage device for one or more policy rules associated with the application feature associated with the network traffic and/or the application associated with the network traffic.

As shown in FIG. 1B, the policy information may be identified (e.g., for one or more application features) in a feature type-based policy mapping stored by the security policy storage device. Additionally, or alternatively, the policy information may be identified (e.g., for one or more application features associated with an application) in an application feature-based policy mapping stored by the security policy storage device. An entry in a policy mapping may identify a policy rule. The policy rule may include policy information, such as a policy enforcement action (e.g., allow (e.g., communicate and/or transmit) or deny (e.g., not communicate and/or not transmit). One or more policy mappings may be received from the provisioning device and stored by the firewall and/or stored by the security policy storage device.

In some implementations, the firewall may perform a lookup operation based on the application feature identifier that identifies the application feature associated with the network traffic and/or based on the application identifier that identifies the application associated with the network traffic. For example, the lookup operation may identify, based on the application feature identifier associated with the network traffic, an entry in a feature type-based policy mapping corresponding to a policy rule that applies to the application feature. The entry in the policy mapping may indicate, such as by the entry including a generic identifier, that the policy information corresponding to the application feature is generic policy information (e.g., applies to all applications that contain that application feature).

Additionally, or alternatively, the lookup operation may identify an entry in an application feature-based policy mapping corresponding to the application associated with the network traffic that defines a policy rule including policy information for one or more application features that the application is capable of communicating.

In some implementations, the firewall may first perform a search and/or lookup operation for a policy rule based on the application feature identifier. If the firewall identifies a policy rule (e.g., a feature type-based policy rule) based on the search and/or lookup operation using the application feature identifier, the firewall may apply the identified policy rule to the network traffic. If the firewall determines that there is no policy rule corresponding to the application feature identifier (e.g., no feature type-based policy rule that applies to the application feature), the firewall may search and/or perform a lookup operation for a policy rule based on the application identifier. If the firewall identifies a policy rule (e.g., an application feature-based policy rule) based on the search and/or lookup operation using the application identifier, the firewall may apply the identified policy rule to the network traffic. In this way, the firewall may conserve computing resources and/or network resources that would have otherwise been used performing a search and/or a lookup operation based on an application identifier when there is a policy rule that applies independent of the application (e.g., a feature type-based policy rule).

In this way, the firewall may determine, based on policy information that is associated with the application feature and/or is associated with the application, whether network traffic is permitted to be communicated via the network.

As further shown in FIG. 1B, and by reference number 180, the firewall may allow or deny the network traffic, based on the policy information included in the policy rule that applies to the network traffic. For example, the firewall may perform one or more policy enforcement actions included in the policy information, such as allowing the network traffic to be communicated (e.g., permitting the network traffic to be communicated), forwarding the network traffic, blocking or dropping the network traffic, flagging (e.g., sending a notification to a device associated with a network operator) and permitting the network traffic, flagging and blocking or dropping the network traffic, and/or the like.

Additionally, or alternatively, the firewall may perform one or more other policy enforcement actions associated with communication of the network traffic. For example, the policy enforcement action included in the policy information may set parameters for communication of network traffic. Such parameters may include a data rate, a usable bandwidth for communication of the network traffic, timing parameters (e.g., time limits, scheduling, and/or the like) associated the session, and/or the like. In this way, the firewall, when enabling the communication of the network traffic for the session, may cause the network traffic to be communicated with particular parameters. Accordingly, the firewall may cause the session associated with the network traffic to be established via the network. In some implementations, the firewall may notify a source of the network traffic that the session can be established and/or that network traffic associated with the session is permitted to be communicated via the network (e.g., via an acknowledgement message).

Additionally, or alternatively, if communication of the network traffic is to be not permitted (e.g., denied), the firewall may send a notification that reflects the same. In some implementations, such a notification may indicate the reasoning used to determine that the communication cannot be performed via the network. For example, the firewall may indicate that an application feature associated with the network traffic is not permitted to be used with the application (e.g., based on an application feature-based policy rule). Additionally, or alternatively, the firewall may indicate (e.g., to Endpoint Device 1 and/or Endpoint Device 2) which applications can be used in association with the application feature to communicate network traffic via the network (e.g., according to the policy rules stored by the security policy storage device). In some implementations, if communication of the network traffic is to be not permitted (e.g., denied), the firewall may cause the application (e.g., on Endpoint Device 1 and/or Endpoint Device 2) to automatically disable the application feature associated with the network traffic that is not permitted.

In some implementations, the firewall may maintain a log of policy rules enforced in association with network traffic associated with the network. For example, the firewall may indicate, in the log, the application feature identified from the network traffic and log whether communication of the network traffic was allowed or denied. In some implementations, the firewall may log which policy rule and/or which entry, in a policy mapping, was used to allow or deny the communication (e.g., to permit enforcement of that policy to be reviewed and/or verified for accuracy). In some implementations, the firewall may log all entries associated with an application feature regardless of the application associated with the network traffic (e.g., if the application feature is associated with a generic identifier). In such cases, the entry may reflect an application feature and/or an application that was enforced based on the policy. As such, forensic information contained within the log may be application independent (e.g., the log may include a plurality of entries corresponding to a plurality of applications, all of which are associated with the same application feature). Accordingly, the firewall may utilize a log to permit the policy enforcement and/or one or more actions performed by the firewall to be reviewed, analyzed, and/or verified for accuracy. In some implementations, the log may be used as the historical data used by the provisioning device (and/or a device related to the provisioning device) to determine new and/or updated policy rules.

In this way, the firewall provides a more granular policy for handling network traffic associated with an application. The firewall (and/or a network device associated with the firewall) may conserve resources (e.g., computing resources and/or network resources) that would have otherwise been used to prevent communication of network traffic that would be permitted based on an application feature-based policy and/or a feature type-based policy. Additionally, or alternatively, the firewall (and/or a network device associated with the firewall) may conserve resources (e.g., computing resources and/or network resources) that would have otherwise been used to permit and provide communication of network traffic that would be prevented based on an application feature-based policy and/or a feature type-based policy.

As indicated above, FIGS. 1A and 1B are provided merely as one or more examples. Other examples may differ from what is described with regard to FIGS. 1A and 1B. The number and arrangement of devices and/or networks shown in FIGS. 1A and 1B are provided as one or more examples. In practice, there may be additional devices and/or networks, fewer devices and/or networks, different devices and/or networks, or differently arranged devices and/or networks than those shown in FIGS. 1A and 1B. Furthermore, two or more devices shown in FIGS. 1A and 1B may be implemented within a single device, or a single device shown in FIGS. 1A and 1B may be implemented as multiple, distributed devices. Additionally, or alternatively, a set of devices (e.g., one or more devices) of FIGS. 1A and 1B may perform one or more functions described as being performed by another set of devices of FIGS. 1A and 1B.

Figure 2B:
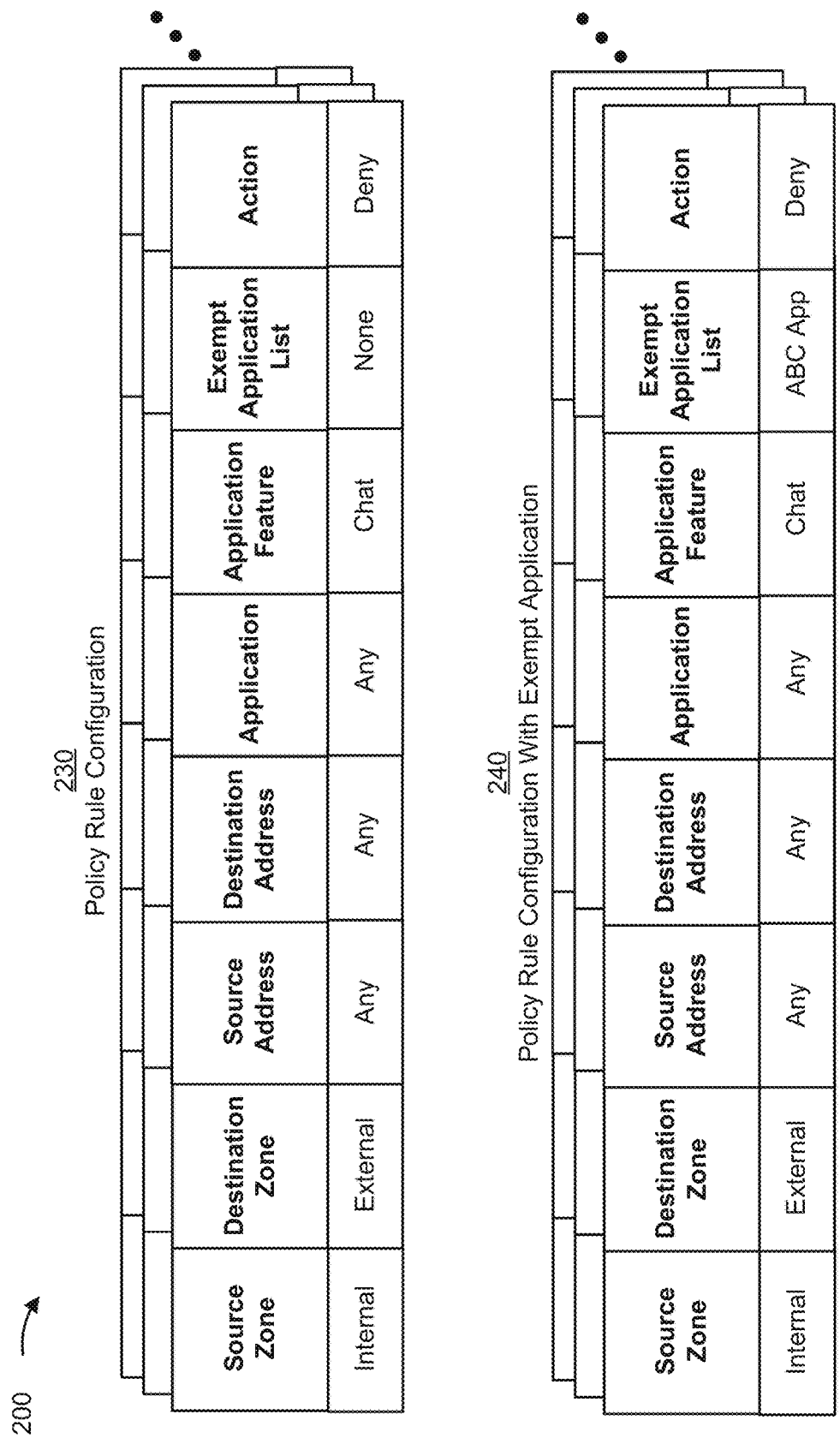

FIGS. 2A and 2B are diagrams of one or more example implementations 200 described herein. As shown in FIG. 2A, one or more example implementations 200 may include an example application feature-based policy mapping 210 for Application 1 with entries that include one or more application feature identifiers corresponding to one or more application features. Additionally, one or more example implementations 200 may include an example feature type-based policy mapping 220 for Application Feature 1 with entries that include one or more application identifiers corresponding to one or more applications.

The example application feature-based policy mapping 210 for Application 1 and the example feature type-based policy mapping 220 for Application Feature 1 may be example data structures associated with a policy rule. In some implementations, a policy mapping may include one, both, or a combination of data structures having a format similar to that of the example application feature-based policy mapping 210 for Application 1 and/or the feature type-based policy mapping 220 for Application Feature 1.

As shown in FIG. 2A, the example application feature-based policy mapping 210 for Application 1 may include one or more application feature identifiers corresponding to one or more application features. In some implementations, there may be a plurality of application feature-based policy mappings 210 corresponding to a plurality of applications. Each entry may include a corresponding policy enforcement action. The policy enforcement action may be an action similar to those described above with respect to FIGS. 1A and 1B.

For example, the example application feature-based policy mapping 210 for Application 1 may identify application features shown as chat (e.g., network traffic associated with chat traffic), social media (e.g., network traffic associated with social media traffic), audio streaming (e.g., network traffic associated with audio streaming), and/or the like. The example application feature-based policy mapping 210 for Application 1 may include an entry that identifies that the policy enforcement action for network information associated with Application 1 and the application feature Chat is to allow (e.g., permit) the network information to be communicated and/or transmitted. The example application feature-based policy mapping 210 for Application 1 may include an entry that identifies that the policy enforcement action for network information associated with Application 1 and the application feature Social Media is to deny (e.g., prevent) the network information to be communicated and/or transmitted. The example application feature-based policy mapping 210 for Application 1 may include an entry that identifies that the policy enforcement action for network information associated with Application 1 and the application feature Audio Streaming is to deny (e.g., prevent) the network information to be communicated and/or transmitted.

In some implementations, the example application feature-based policy mapping 210 for Application 1 may include all application features associated with network traffic that Application 1 is capable of communicating and/or transmitting. In some implementations, an application feature-based policy mapping 210 for Application 1 may identify only the application features which are to be prevented (e.g., denied) from being communicated via the network, which conserves memory resources that would have otherwise been used to store entries relating to application features which are to be permitted (e.g., allowed). In this way, the application feature-based policy mapping 210 may provide an application specific policy mapping that identifies one or more application features and a respective policy enforcement action associated with the one or more application features as applied to network traffic associated with Application 1.

As further shown in FIG. 2A, an example feature type-based policy mapping 220 for Application Feature 1 may include entries that include one or more application identifiers corresponding to one or more applications. In some implementations, a policy mapping may include a plurality of feature type-based policy mappings 220 corresponding to a plurality of application features.

Each entry in the feature type-based policy mapping 220 associated with the one or more applications may include a corresponding policy enforcement action. The policy enforcement action may be an action similar to those described above with respect to FIGS. 1A and 1B.

In some implementations, the feature type-based policy mapping 220 may correspond to a generic application feature. A generic application feature may be an application feature that includes the same policy enforcement action for network traffic of all applications that contain that application feature. As such, a policy rule associated with a generic application feature may cause a firewall to apply the same policy enforcement action, regardless of the application associated with the network traffic. For example, the policy enforcement action associated with a policy rule of a generic application feature may be to not permit communication (e.g., deny) of all network traffic associated with the generic application feature. A feature type-based policy mapping associated with a generic application feature may not identify any specific applications in the policy mapping. Rather, the feature type-based policy mapping may include only a generic identifier, such as "Any," that indicates that the policy rule applies to any application associated with the application feature.

In some implementations, the feature type-based policy mapping 220 associated with a generic application feature may enable the default policy enforcement action to be performed even if there is no entry in the feature type-based policy mapping 220 corresponding to the application associated with the network traffic. In this way, the feature type-based policy mapping 220 associated with a policy rule for a generic application feature allows a policy enforcement action to be performed with respect to network traffic regardless of whether the application associated with the network traffic has been previously identified by a device (such as the provisioning device) and/or included in the application feature policy mapping.

In some implementations, a feature type-based policy mapping of a policy rule for a generic application feature may identify an exempt application. An exempt application may be an application that has a policy enforcement action that is different than the default policy enforcement action. For example, as shown in FIG. 2A, an application with an application identifier of "ABC App" may be an exempt application with respect to Application Feature 1. The default policy enforcement action associated with Application Feature 1 may be to prevent (e.g., deny) all network traffic associated with Application Feature 1. However, the policy enforcement action for network traffic associated with Application Feature 1 and ABC App may be to permit (e.g., allow) the network traffic to be communicated and/or transmitted. In some implementations, only exempt applications may be identified by the application identifier in a feature-type based policy mapping 220 (e.g., applications that are to be enforced based on the default policy enforcement action may not be included in the feature type-based policy mapping 220).

As such, a feature type-based policy mapping 220 for a policy rule of a generic application feature may allow for a more granular policy that would prevent network traffic from being dropped, and thus conserves resources (e.g., computing resources and/or network resources) that would have otherwise been used transmitting and/or processing network traffic that would be dropped based on an application-based policy.

As shown in FIG. 2B, example implementation(s) 200 may include one or more policy rule configurations. A policy rule configuration may be a policy mapping associated with the policy rule. The one or more policy rule configurations may include one or more policy fields. A policy field may be associated with one or more aspects used to define policy information (e.g., information that can be used to define the network traffic that the policy rule applies to and define how a firewall is to handle the network traffic that the policy rule applies to). Examples of policy fields may include a field relating to a source zone of the network traffic (e.g., internal to the network, external to the network, and/or the like), a field relating to a destination zone of the network traffic (e.g., internal to the network, external to the network, and/or the like), a field relating to a source address associated with the network traffic (such as an IP address), a field relating to a destination address associated with the network traffic (such as an IP address), a field related to a user associated with the network a field relating to a port associated with the network traffic, a field relating to an application associated with the network traffic (e.g., which application(s) the policy information applies to), a field relating to an application feature associated with the network traffic (e.g., which application feature(s) the policy information applies to), a field relating to an exempt application list associated with the policy rule (e.g., identifying an application and/or an application feature that is exempt from the policy established by the policy rule), a field relating to an action to be performed by a firewall (e.g., a policy enforcement action), and/or the like. The policy rule configurations and/or the policy fields may be configured by a provisioning device and/or a firewall, as described above with respect to FIGS. 1A and 1B.

In some implementations, one or more entries corresponding to one or more policy fields may be defined based on user input. For example, a user, such as a network operator, may define the entries (e.g., using a device associated with the network operator) corresponding to one or more policy fields to define the policy information applied to network traffic communicated over the network. The user input may be received prior to a firewall receiving the network traffic.

As shown in FIG. 2B, and as an example, a policy rule configuration 230 may include the following policy fields corresponding entries: source zone (internal), destination zone (external), source address (Any), destination address (Any), application (Any), application feature (Chat), exempt application list (None), and action (Deny). As such, the policy rule configuration 230 may establish policy information that applies to network traffic originating from internal to the network (e.g., source zone) and transmitting to external to the network (e.g., destination zone). The policy rule configuration 230 may establish policy information that applies to network traffic originating from and going to any device (e.g., the source address and the destination address). The policy rule configuration 230 may establish policy information that applies to network traffic associated with any dynamic application. The policy rule configuration 230 may establish policy information that applies to network traffic associated the application feature of chat (e.g., network traffic associated with chat traffic). The policy rule configuration 230 may establish policy information that there are no exempt applications. The policy rule configuration 230 may establish policy information that the policy enforcement action (e.g., the default policy enforcement action) for network traffic that satisfies policy rule configuration 230 is to deny (e.g., prevent communication of) the network traffic. As such, policy rule configuration 230 may establish a feature type-based policy rule that would deny all network traffic associated with the application feature of chat, regardless of the application the network traffic is associated with.

As further shown in FIG. 2B, and as an example, a policy rule configuration 240 may establish an exempt application and/or application feature. For example, policy rule configuration 240 may have the same policy field and entries as policy rule configuration 230 except with respect to the policy field of application feature exempt list. Policy rule configuration 240 may include an entry corresponding to the policy field of exempt application list of "ABC App." The policy rule configuration 240 may establish an application feature-based policy that would deny all network traffic associated with the application feature of chat, except network traffic associated with the application ABC App (e.g., the policy would deny all chat related network traffic except chat related network traffic from ABC App).

In some implementations, there may be a plurality of policy rule configurations established in a manner similar to that as described herein with respect to FIG. 2B. For example, an application feature-based policy rule may be established by designating a specific application in the policy field of application (instead of "Any" as shown in FIG. 2B) and an application feature. Such a policy rule configuration would create an application feature-based policy rule that applies to network traffic associated with the application identified in the policy field of application and the application feature identified in the policy field application feature.

As indicated above, FIGS. 2A and 2B are provided merely as one or more examples. Other examples may differ from what is described with regard to FIGS. 2A and 2B.

Figure 3:
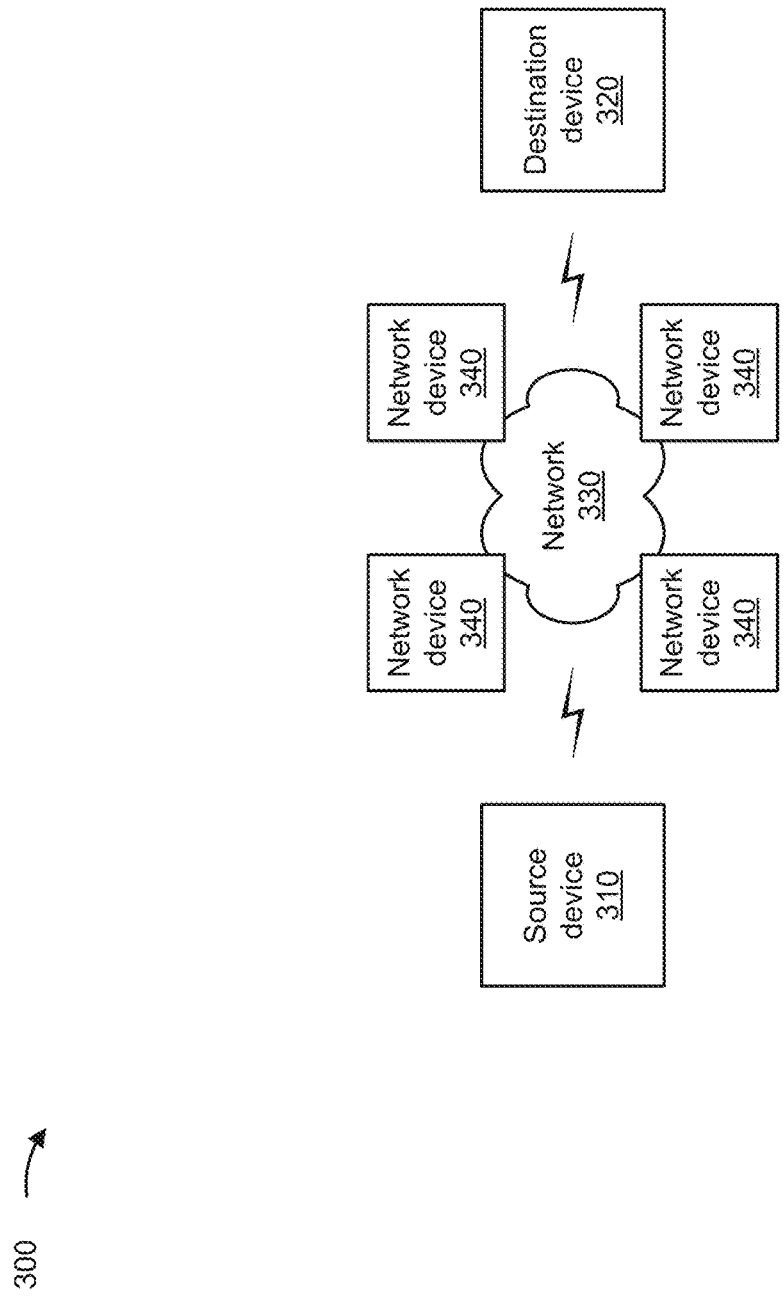
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a source device 310, a destination device 320, a network 330, and one or more network devices 340 (referred to herein individually as network device 340 or collectively as network devices 340). Devices of environment 300 may interconnect via wired connections, wireless connections, or a combination of wired and wireless connections.

Source device 310 and/or destination device 320 include one or more devices capable of receiving, generating, storing, processing, and/or providing network traffic associated with an application and/or a session, as described herein. For example, source device 310 and/or destination device 320 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device. In some implementations, source device and/or destination device may be a cloud-based platform of a cloud computing environment, a web-based platform, an online platform, and/or the like. Source device 310 and destination device 320 may correspond to the first endpoint device and the second endpoint device described in connection with example implementation(s) 100.

Network 330 includes one or more wired and/or wireless networks. For example, network 330 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Network device 340 includes one or more devices (e.g., one or more traffic transfer devices) capable of processing and/or transferring traffic between endpoint devices (e.g., source device 310 and destination device 320). For example, network device 340 may include a firewall, a router, a gateway, a switch, a hub, a bridge, a reverse proxy, a server (e.g., a proxy server), a security device, an intrusion detection device, a load balancer, or a similar device. In some implementations, network device 340 may be a physical device implemented within a housing, such as a chassis. In some implementations, network device 340 may be a virtual device implemented by one or more computer devices of a cloud computing environment or a data center.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4A:
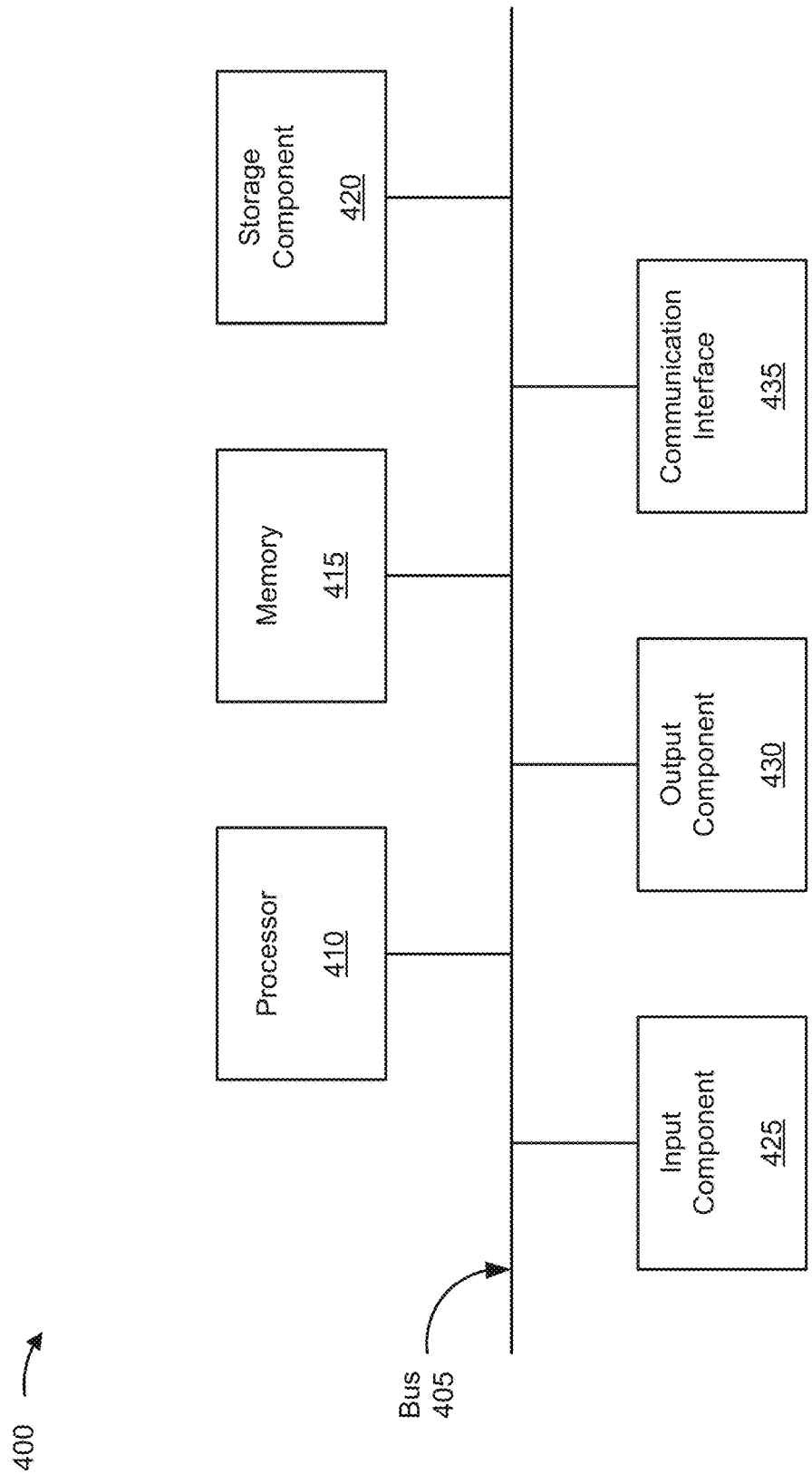
FIGS. 4A and 4B are diagrams of one or more example components of one or more devices of FIG. 3.
Figure 4B:
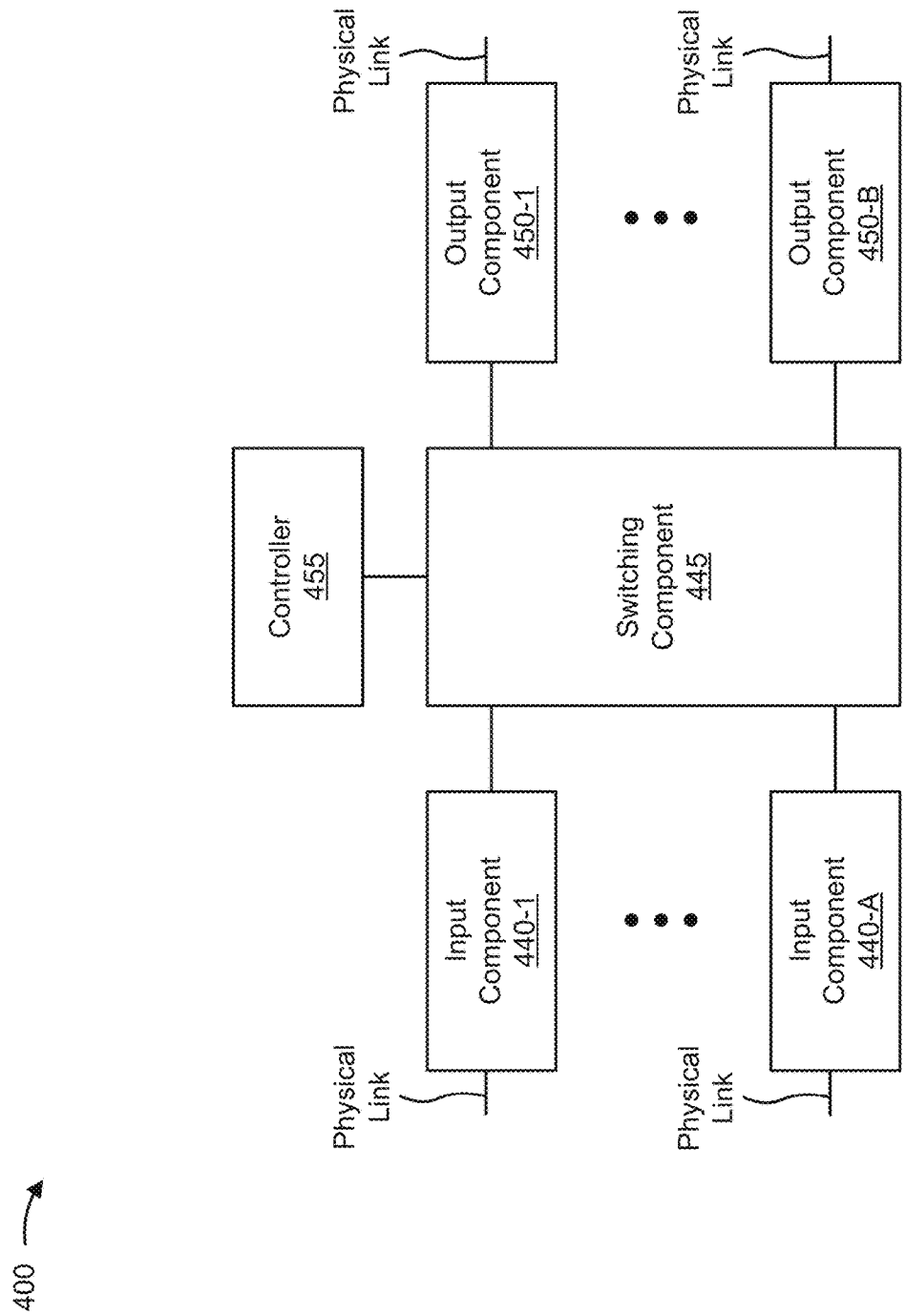

FIGS. 4A and 4B are diagrams of one or more example components of a device(s) 400. Device(s) 400 may correspond to source device 310, destination device 320, and/or network device 340. In some implementations, source device 310, destination device 320, and/or network device 340 may include one or more devices 400 and/or one or more components of device(s) 400. As shown in FIG. 4A, device(s) 400 may include a bus 405, a processor 410, a memory 415, a storage component 420, an input component 425, an output component 430, and a communication interface 435.

Bus 405 includes a component that permits communication among multiple components of device(s) 400. Processor 410 is implemented in hardware, firmware, and/or a combination of hardware and software. Processor 410 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 410 includes one or more processors capable of being programmed to perform a function. Memory 415 includes a random access memory (RAM), a read only memory (ROM), and/or another type of dynamic or static storage device (e.g., a flash memory, a magnetic memory, and/or an optical memory) that stores information and/or instructions for use by processor 410.

Storage component 420 stores information and/or software related to the operation and use of device(s) 400. For example, storage component 420 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive. Storage component 420 may be used to store and/or implement the security policy storage device of example implementation 100.

Input component 425 includes a component that permits device(s) 400 to receive information, such as via user input (e.g., a touch screen display, a keyboard, a keypad, a mouse, a button, a switch, and/or a microphone). Additionally, or alternatively, input component 425 may include a component for determining location (e.g., a global positioning system (GPS) component) and/or a sensor (e.g., an accelerometer, a gyroscope, an actuator, another type of positional or environmental sensor, and/or the like). Output component 430 includes a component that provides output information from device(s) 400 (via, e.g., a display, a speaker, a haptic feedback component, an audio or visual indicator, and/or the like).

Communication interface 435 includes a transceiver-like component (e.g., a transceiver, a separate receiver, a separate transmitter, and/or the like) that enables device(s) 400 to communicate with other devices, such as via a wired connection, a wireless connection, or a combination of wired and wireless connections. Communication interface 435 may permit device(s) 400 to receive information from another device and/or provide information to another device. For example, communication interface 435 may include an Ethernet interface, an optical interface, a coaxial interface, an infrared interface, a radio frequency (RF) interface, a universal serial bus (USB) interface, a Wi-Fi interface, a cellular network interface, and/or the like.

Device(s) 400 may perform one or more processes described herein. Device(s) 400 may perform these processes based on processor 410 executing software instructions stored by a non-transitory computer-readable medium, such as memory 415 and/or storage component 420. As used herein, the term "computer-readable medium" refers to a non-transitory memory device. A memory device includes memory space within a single physical storage device or memory space spread across multiple physical storage devices.

Software instructions may be read into memory 415 and/or storage component 420 from another computer-readable medium or from another device via communication interface 435. When executed, software instructions stored in memory 415 and/or storage component 420 may cause processor 410 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4A are provided as an example. In practice, device(s) 400 may include additional components, fewer components, different components, or differently arranged components than those shown in FIG. 4A. Additionally, or alternatively, a set of components (e.g., one or more components) of device(s) 400 may perform one or more functions described as being performed by another set of components of device(s) 400.

As shown in FIG. 4B, device(s) 400 may include one or more input components 440-1 through 440-A (B≥1) (hereinafter referred to collectively as input components 440, and individually as input component 440), a switching component 445, one or more output components 450-1 through 450-B (B≥1) (hereinafter referred to collectively as output components 450, and individually as output component 450), and a controller 455.

Input component 440 may be one or more points of attachment for physical links and may be one or more points of entry for incoming traffic, such as packets. Input component 440 may process incoming traffic, such as by performing data link layer encapsulation or decapsulation. In some implementations, input component 440 may transmit and/or receive packets. In some implementations, input component 440 may include an input line card that includes one or more packet processing components (e.g., in the form of integrated circuits), such as one or more interface cards (IFCs), packet forwarding components, line card controller components, input ports, processors, memories, and/or input queues. In some implementations, device(s) 400 may include one or more input components 440.

Switching component 445 may interconnect input components 440 with output components 450. In some implementations, switching component 445 may be implemented via one or more crossbars, via busses, and/or with shared memories. The shared memories may act as temporary buffers to store packets from input components 440 before the packets are eventually scheduled for delivery to output components 450. In some implementations, switching component 445 may enable input components 440, output components 450, and/or controller 455 to communicate with one another.

Output component 450 may store packets and may schedule packets for transmission on output physical links. Output component 450 may support data link layer encapsulation or decapsulation, and/or a variety of higher-level protocols. In some implementations, output component 450 may transmit packets and/or receive packets. In some implementations, output component 450 may include an output line card that includes one or more packet processing components (e.g., in the form of integrated circuits), such as one or more IFCs, packet forwarding components, line card controller components, output ports, processors, memories, and/or output queues. In some implementations, device(s) 400 may include one or more output components 450. In some implementations, input component 440 and output component 450 may be implemented by the same set of components (e.g., and input/output component may be a combination of input component 440 and output component 450).

Controller 455 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 455 may include one or more processors that can be programmed to perform a function.

In some implementations, controller 455 may include a RAM, a ROM, and/or another type of dynamic or static storage device (e.g., a flash memory, a magnetic memory, an optical memory, etc.) that stores information and/or instructions for use by controller 455.

In some implementations, controller 455 may communicate with other devices, networks, and/or systems connected to device(s) 400 to exchange information regarding network topology. Controller 455 may create routing tables based on the network topology information, may create forwarding tables based on the routing tables, and may forward the forwarding tables to input components 440 and/or output components 450. Input components 440 and/or output components 450 may use the forwarding tables to perform route lookups for incoming and/or outgoing packets.

Controller 455 may perform one or more processes described herein. Controller 455 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 455 from another computer-readable medium or from another device via a communication interface. When executed, software instructions stored in a memory and/or storage component associated with controller 455 may cause controller 455 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4B are provided as an example. In practice, device(s) 400 may include additional components, fewer components, different components, or differently arranged components than those shown in FIG. 4B. Additionally, or alternatively, a set of components (e.g., one or more components) of device(s) 400 may perform one or more functions described as being performed by another set of components of device(s) 400.

Figure 5:
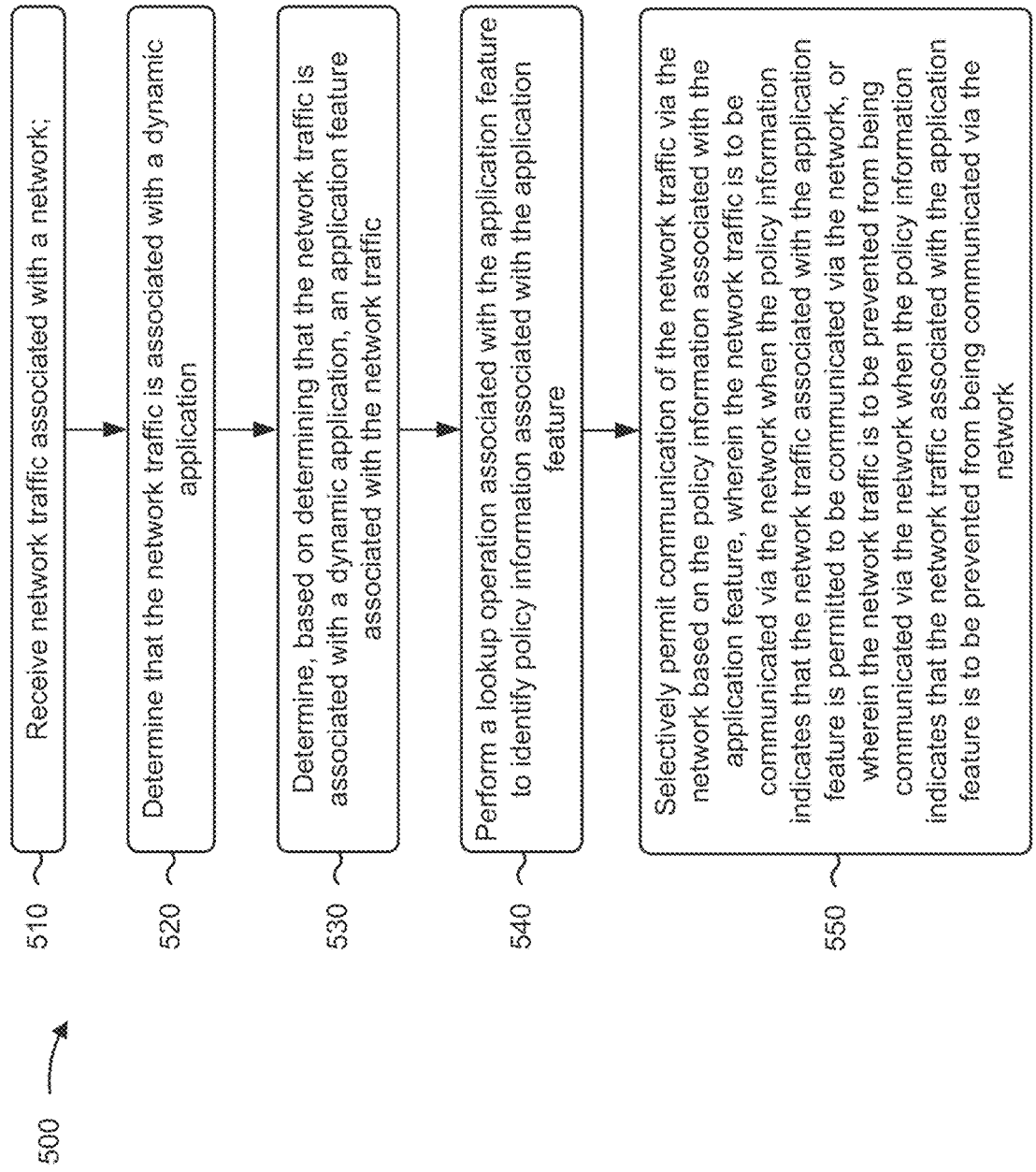
FIGS. 5-7 are flowcharts of one or more example processes associated with network traffic control based on an application feature.

FIG. 5 is a flow chart of an example process 500 for network traffic control based on an application feature. In some implementations, one or more process blocks of FIG. 5 may be performed by a network device (e.g., a firewall of FIGS. 1A and 1B, network device 340 of FIG. 3, and/or the like). In some implementations, one or more process blocks of FIG. 5 may be performed by another device or a group of devices separate from or including the network device, such as a source device (e.g., source device 310), a destination device (e.g., destination device 320), a provisioning device, and/or the like.

As shown in FIG. 5, process 500 may include receiving network traffic associated with a network; (block 510). For example, the network device (e.g., using processor 410, memory 415, storage component 420, input component 425, output component 430, communication interface 435, input component 440, switching component 445, output component 450, controller 455, and/or the like) may receive network traffic associated with a network, as described above.

As further shown in FIG. 5, process 500 may include determining that the network traffic is associated with a dynamic application (block 520). For example, the network device (e.g., using processor 410, memory 415, storage component 420, input component 425, output component 430, communication interface 435, input component 440, switching component 445, output component 450, controller 455, and/or the like) may determine that the network traffic is associated with a dynamic application, as described above.

As further shown in FIG. 5, process 500 may include determining, based on determining that the network traffic is associated with a dynamic application, an application feature associated with the network traffic (block 530). For example, the network device (e.g., using processor 410, memory 415, storage component 420, input component 425, output component 430, communication interface 435, input component 440, switching component 445, output component 450, controller 455, and/or the like) may determine, based on determining that the network traffic is associated with a dynamic application, an application feature associated with the network traffic, as described above.

As further shown in FIG. 5, process 500 may include performing a lookup operation associated with the application feature to identify policy information associated with the application feature (block 540). For example, the network device (e.g., using processor 410, memory 415, storage component 420, input component 425, output component 430, communication interface 435, input component 440, switching component 445, output component 450, controller 455, and/or the like) may perform a lookup operation associated with the application feature to identify policy information associated with the application feature, as described above.

As further shown in FIG. 5, process 500 may include selectively permitting communication of the network traffic via the network based on the policy information associated with the application feature, wherein the network traffic is to be communicated via the network when the policy information indicates that the network traffic associated with the application feature is permitted to be communicated via the network, or wherein the network traffic is to be prevented from being communicated via the network when the policy information indicates that the network traffic associated with the application feature is to be prevented from being communicated via the network (block 550). For example, the network device (e.g., using processor 410, memory 415, storage component 420, input component 425, output component 430, communication interface 435, input component 440, switching component 445, output component 450, controller 455, and/or the like) may selectively permit, by the network device, communication of the network traffic via the network based on the policy information associated with the application feature, as described above. In some implementations, the network traffic is to be communicated via the network when the policy information indicates that the network traffic associated with the application feature is permitted to be communicated via the network. In some implementations, the network traffic is to be prevented from being communicated via the network when the policy information indicates that the network traffic associated with the application feature is to be prevented from being communicated via the network.

Process 500 may include additional implementations, such as any single implementation or any combination of implementations described below and/or in connection with one or more other processes described elsewhere herein.

In a first implementation, prior to receiving the network traffic, the policy information is determined based on analysis, via deep packet inspection, of historical sets of network traffic that are associated with the application feature, and the application feature is designated for policy enforcement, wherein the lookup operation is performed based on the application feature being designated for policy enforcement.

In a second implementation, alone or in combination with the first implementation, prior to receiving the network traffic, process 500 includes determining the policy information based on a user input associated with enabling or disabling network traffic that is associated with the application feature.

In a third implementation, alone or in combination with one or more of the first and second implementations, when determining that the network traffic is associated with a dynamic application process 500 includes: analyzing a payload of the network traffic; identifying an application identifier in the payload that identifies an application associated with the network traffic; determining, from an list of dynamic applications, that the application is designated as a dynamic application, and determining, based on the application being designated as a dynamic application, that the network traffic is associated with a dynamic application.

In a fourth implementation, alone or in combination with one or more of the first through third implementations, when performing the lookup operation process 500 includes: identifying the application feature based on traffic information within the network traffic; locating a policy mapping associated with the application feature, and obtaining the policy information from the policy mapping, the policy information for the application feature indicates whether the network traffic is permitted to be communicated or is to be prevented from being communicated via the network.

In a fifth implementation, alone or in combination with one or more of the first through fourth implementations, the policy mapping is an application feature-based policy mapping that defines corresponding policy enforcement actions for a plurality of application features.

In a sixth implementation, alone or in combination with one or more of the first through fifth implementations, the policy information identifies a policy enforcement action for the application feature based on an application identifier of the dynamic application.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
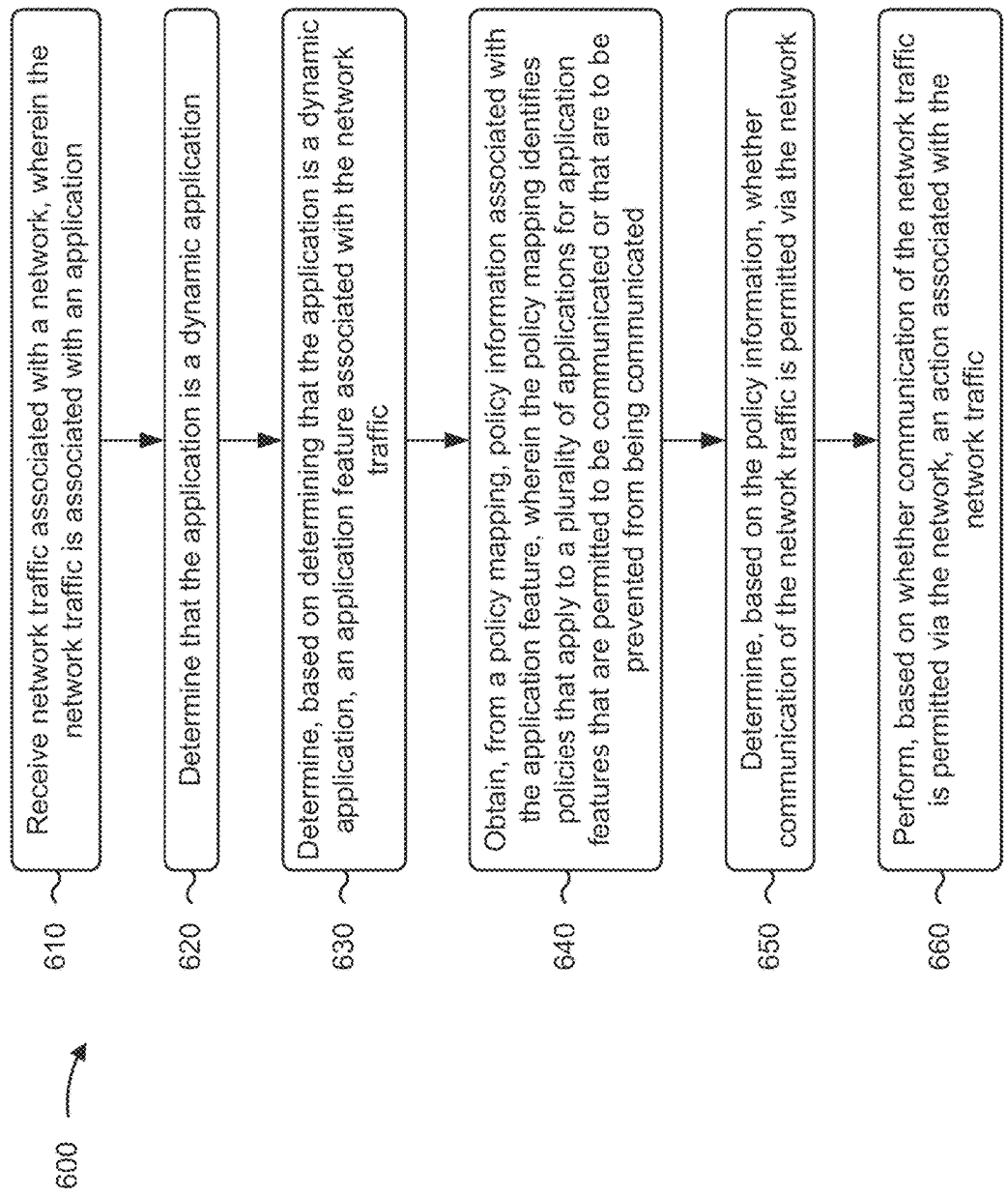

FIG. 6 is a flow chart of an example process 600 for network traffic control based on an application feature. In some implementations, one or more process blocks of FIG. 6 may be performed by a network device (e.g., a firewall of FIGS. 1A and 1B, network device 340 of FIG. 3, and/or the like). In some implementations, one or more process blocks of FIG. 5 may be performed by another device or a group of devices separate from or including the network device, such as a source device (e.g., source device 310), a destination device (e.g., destination device 320), a provisioning device, and/or the like.

As shown in FIG. 6, process 600 may include receiving network traffic associated with a network, wherein the network traffic is associated with an application (block 610). For example, the network device (e.g., using processor 410, memory 415, storage component 420, input component 425, output component 430, communication interface 435, input component 440, switching component 445, output component 450, controller 455, and/or the like) may receive network traffic associated with a network, as described above. In some implementations, the network traffic is associated with an application.

As further shown in FIG. 6, process 600 may include determining that the application is a dynamic application (block 620). For example, the network device (e.g., using processor 410, memory 415, storage component 420, input component 425, output component 430, communication interface 435, input component 440, switching component 445, output component 450, controller 455, and/or the like) may determine that the application is a dynamic application, as described above.

As further shown in FIG. 6, process 600 may include determining, based on determining that the application is a dynamic application, an application feature associated with the network traffic (block 630). For example, the network device (e.g., using processor 410, memory 415, storage component 420, input component 425, output component 430, communication interface 435, input component 440, switching component 445, output component 450, controller 455, and/or the like) may determine, based on determining that the application is a dynamic application, an application feature associated with the network traffic, as described above.

As further shown in FIG. 6, process 600 may include obtaining, from a policy mapping, policy information associated with the application feature, wherein the policy mapping identifies policies that apply to a plurality of applications for application features that are permitted to be communicated or that are to be prevented from being communicated (block 640). For example, the network device (e.g., using processor 410, memory 415, storage component 420, input component 425, output component 430, communication interface 435, input component 440, switching component 445, output component 450, controller 455, and/or the like) may obtain, from a policy mapping, policy information associated with the application feature, as described above. In some implementations, the policy mapping identifies policies that apply to a plurality of applications for application features that are permitted to be communicated or that are to be prevented from being communicated.

As further shown in FIG. 6, process 600 may include determining, based on the policy information, whether communication of the network traffic is permitted via the network (block 650). For example, the network device (e.g., using processor 410, memory 415, storage component 420, input component 425, output component 430, communication interface 435, input component 440, switching component 445, output component 450, controller 455, and/or the like) may determine, based on the policy information, whether communication of the network traffic is permitted via the network, as described above.

As further shown in FIG. 6, process 600 may include performing, based on whether communication of the network traffic is permitted via the network, an action associated with the network traffic (block 660). For example, the network device (e.g., using processor 410, memory 415, storage component 420, input component 425, output component 430, communication interface 435, input component 440, switching component 445, output component 450, controller 455, and/or the like) may perform, based on whether communication of the network traffic is permitted via the network, an action associated with the network traffic, as described above.

Process 600 may include additional implementations, such as any single implementation or any combination of implementations described below and/or in connection with one or more other processes described elsewhere herein.

In a first implementation, when determining that the application is a dynamic application, process 600 includes analyzing a payload of the network traffic; identifying an application identifier that identifies the application; and determining, from a list of dynamic applications, that the application is designated as a dynamic application.

In a second implementation, alone or in combination with the first implementation, when obtaining the policy information, process 600 includes performing a lookup operation in association with the policy mapping to identify an entry that identifies the application feature; and obtaining the policy information from the entry, wherein the policy information is indicating whether the network traffic is permitted to be communicated via the network or is to be prevented from being communicated via the network.

In a third implementation, alone or in combination with one or more of the first and second implementations, the entry includes a generic identifier associated with the application feature, wherein the generic identifier indicates that the policy information applies to network traffic that is associated with the application feature and any application.

In a fourth implementation, alone or in combination with one or more of the first through third implementations, the entry includes an application identifier associated with the application, the application identifier indicates that the policy information applies to network traffic that is specifically associated with the application.

In a fifth implementation, alone or in combination with one or more of the first through fourth implementations, when performing the action, process 600 includes at least one of: forwarding, when communication of the network traffic is determined to be permitted, the network traffic via the network, or preventing, when communication of the network traffic is determined to not be permitted, the network traffic from being communicated via the network.

In a sixth implementation, alone or in combination with one or more of the first through fifth implementations, process 600 includes logging the policy information associated with the application feature.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
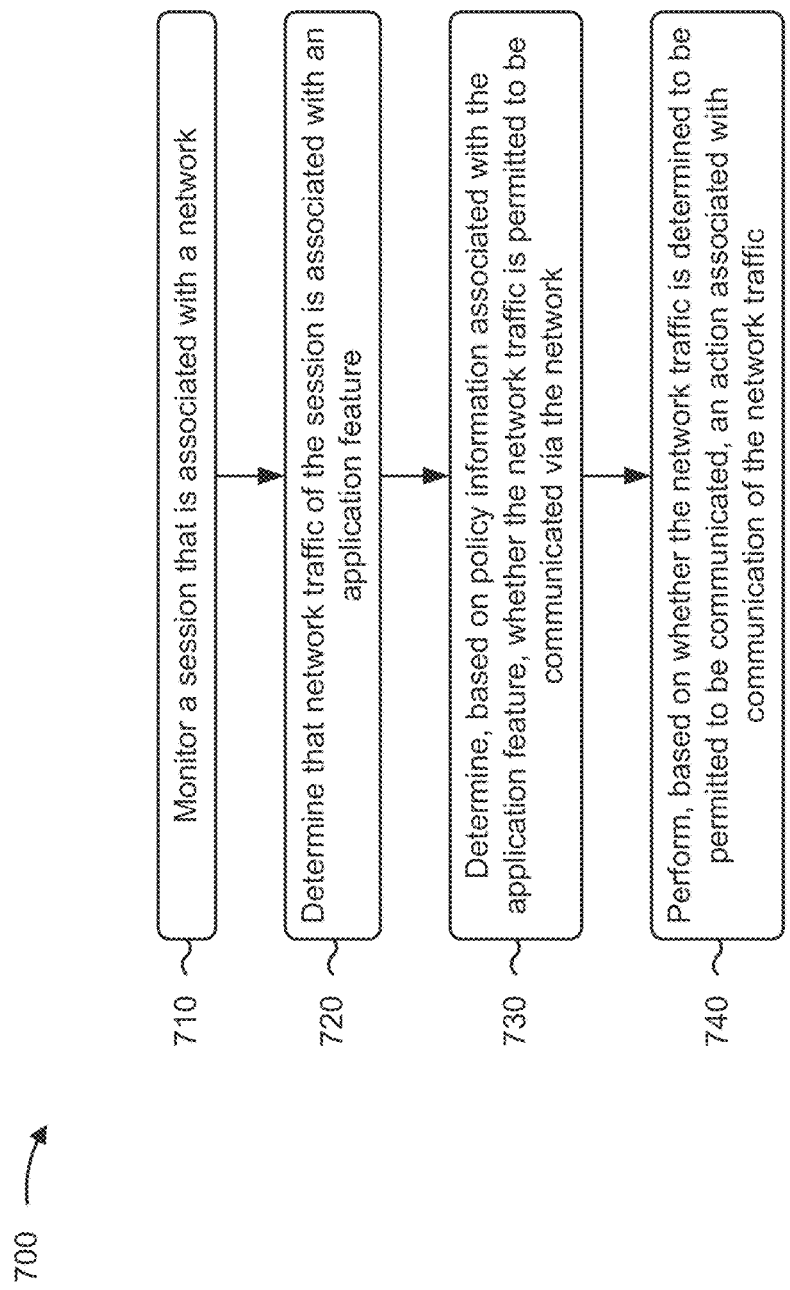

FIG. 7 is a flow chart of an example process 700 for network traffic control based on an application feature. In some implementations, one or more process blocks of FIG. 7 may be performed by a network device (e.g., a firewall of FIGS. 1A and 1B, network device 340 of FIG. 3, and/or the like). In some implementations, one or more process blocks of FIG. 5 may be performed by another device or a group of devices separate from or including the network device, such as a source device (e.g., source device 310), a destination device (e.g., destination device 320), a provisioning device, and/or the like.

As shown in FIG. 7, process 700 may include monitoring a session that is associated with a network (block 710). For example, the network device (e.g., using processor 410, memory 415, storage component 420, input component 425, output component 430, communication interface 435, input component 440, switching component 445, output component 450, controller 455, and/or the like) may monitor a session that is associated with a network, as described above.

As further shown in FIG. 7, process 700 may include determining that network traffic of the session is associated with an application feature (block 720). For example, the network device (e.g., using processor 410, memory 415, storage component 420, input component 425, output component 430, communication interface 435, input component 440, switching component 445, output component 450, controller 455, and/or the like) may determine that network traffic of the session is associated with an application feature, as described above.

As further shown in FIG. 7, process 700 may include determining, based on policy information associated with the application feature, whether the network traffic is permitted to be communicated via the network (block 730). For example, the network device (e.g., using processor 410, memory 415, storage component 420, input component 425, output component 430, communication interface 435, input component 440, switching component 445, output component 450, controller 455, and/or the like) may determine, based on policy information associated with the application feature, whether the network traffic is permitted to be communicated via the network, as described above.

As further shown in FIG. 7, process 700 may include performing, based on whether the network traffic is determined to be permitted to be communicated, an action associated with communication of the network traffic (block 740). For example, the network device (e.g., using processor 410, memory 415, storage component 420, input component 425, output component 430, communication interface 435, input component 440, switching component 445, output component 450, controller 455, and/or the like) may perform, based on whether the network traffic is determined to be permitted to be communicated, an action associated with communication of the network traffic, as described above.

Process 700 may include additional implementations, such as any single implementation or any combination of implementations described below and/or in connection with one or more other processes described elsewhere herein.

In a first implementation, the session is monitored based on analyzing payloads of communications of the session to identify a particular set of communications, the application feature is associated with one or more of the particular set of communications.

In a second implementation, alone or in combination with the first implementation, the session is associated with an application, and the policy information is determined based on information identifying the application.

In a third implementation, alone or in combination with one or more of the first and second implementations, the application feature is a first application feature, the network traffic is first network traffic of the session, the policy information is first policy information that indicates that the first application feature is permitted, and the action comprises a first action that enables communication of the first network traffic via the network, and process 700 includes: determining that a second network traffic is associated with a second application feature that is different from the first application feature; determining that second policy information indicates that the second application feature is not permitted to be communicated via the network, and performing, based on the second policy information, a second action that prevents communication of the second network traffic via the network.

In a fourth implementation, alone or in combination with one or more of the first through third implementations, the network traffic is first network traffic, the session is a first session that is associated with a first application, the policy information is first policy information that indicates that the application feature is permitted for the first application, and the action comprises enabling communication of the first network traffic via the network, and process 700 includes: monitoring a second session that is associated with a second application; determining that a second network traffic of the second session is associated with the application feature; determining that second policy information indicates that the application feature is not permitted to be communicated via the network for the second application, and performing, based on the second policy information, a second action that prevents communication of the second network traffic via the network.

In a fifth implementation, alone or in combination with one or more of the first through fourth implementations, the application feature is associated with one or more of: chat traffic, secure message traffic, media stream traffic, voice communication traffic, media download traffic, media upload traffic, interactive traffic, tunneled traffic, or social media traffic.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, network traffic associated with a network;
   determining, by the network device, that the network traffic is associated with a dynamic application,
      wherein determining that the network traffic is associated with the dynamic application comprises:
         identifying an application identifier of an application associated with the network traffic, and
         determining, from a list of dynamic applications and based on identifying the application identifier, that the application is designated as the dynamic application;
   determining, by the network device and based on determining that the network traffic is associated with the dynamic application, an application feature associated with the network traffic,
      wherein determining the application feature associated with the network traffic comprises:
         identifying an application feature identifier associated with the network traffic, and
         determining, from a list of application features and based on identifying the application feature identifier, the application feature associated with the network traffic;
   determining, by the network device, from a policy mapping, and based on identifying the application identifier and the application feature identifier, a policy rule to apply to the network traffic,
      wherein the policy mapping includes a set of entries corresponding to the policy rule,
         wherein the set of entries includes the application identifier and the application feature identifier; and
   selectively permitting, by the network device, communication of the network traffic via the network based on the policy rule,
      wherein the network traffic is to be communicated via the network when the policy rule indicates that the network traffic associated with the application feature is permitted to be communicated via the network, or
      wherein the network traffic is to be prevented from being communicated via the network when the policy rule indicates that the network traffic associated with the application feature is to be prevented from being communicated via the network.

2. The method of claim 1, wherein, prior to receiving the network traffic, the policy rule is created based on analysis of historical sets of network traffic that are associated with the application feature.

3. The method of claim 1, further comprising, prior to receiving the network traffic:
   creating the policy rule based on a user input associated with enabling or disabling the network traffic associated with the application feature.

4. The method of claim 1, wherein determining that the network traffic is associated with the dynamic application further comprises:
 analyzing a payload of the network traffic,
  wherein the payload includes the application identifier;
 identifying the application identifier in the payload that identifies the application associated with the network traffic; and
 determining, based on the application being designated as the dynamic application, that the network traffic is associated with the dynamic application.

5. The method of claim 1, wherein determining the policy rule comprises:
 performing a lookup operation in association with the policy mapping to identify an entry, of the set of entries, that includes the application identifier; and
 obtain the policy rule from the entry,
  wherein the policy rule indicates whether the network traffic is permitted to be communicated or is to be prevented from being communicated via the network.

6. The method of claim 5, wherein the policy mapping is an application feature-based policy mapping that defines corresponding policy rules for a plurality of application features,
 wherein the corresponding policy rules include the policy rule, and
 wherein the corresponding policy rules identify policy enforcement actions.

7. The method of claim 5, wherein the policy rule identifies a policy enforcement action for the application feature based on the application identifier of the dynamic application.

8. A network device, comprising:
 one or more processors to:
  receive network traffic associated with a network,
   wherein the network traffic is associated with an application;
  determine that the application is a dynamic application,
   wherein the one or more processors, when determining that the application is the dynamic application, are to:
    identify an application identifier associated with the network traffic, and
    determine, from a list of dynamic applications and based on identifying the application identifier, that the application is designated as the dynamic application;
  determine, based on determining that the application is the dynamic application, an application feature associated with the network traffic,
   wherein the one or more processors, when determining the application feature associated with the network traffic, are to:
    identify an application feature identifier associated with the network traffic, and
    determine, from a list of application features and based on identifying the application feature identifier, the application feature associated with the network traffic;
  determine, from a policy mapping and based on identifying the application identifier and the application feature identifier, a policy rule to apply to the network traffic,
   wherein the policy rule indicates whether the network traffic is permitted to be communicated or is to be prevented from being communicated via the network, and
   wherein the policy mapping includes a set of entries corresponding to the policy rule,
    wherein the set of entries includes the application identifier and the application feature identifier;
  determine, based on the policy rule, whether communication of the network traffic is permitted via the network; and
  perform, based on whether communication of the network traffic is permitted via the network, an action associated with the network traffic.

9. The network device of claim 8, wherein the one or more processors, when determining that the application is the dynamic application, are further configured to:
 analyze a payload of the network traffic; and
 identify the application identifier in the payload that identifies the application.

10. The network device of claim 8, wherein the one or more processors, when determining the policy rule, are configured to:
 perform a lookup operation in association with the policy mapping to identify an entry, of the set of entries, that includes the application identifier; and
 obtain the policy rule from the entry.

11. The network device of claim 10,
 wherein the application feature identifier indicates that the policy rule applies to the network traffic that is associated with the application feature and any application.

12. The network device of claim 10,
 wherein the application feature identifier indicates that the policy rule applies to the network traffic that is specifically associated with the application.

13. The network device of claim 8, wherein the one or more processors, when performing the action, are configured to at least one of:
 forward, when communication of the network traffic is determined to be permitted, the network traffic via the network, or
 prevent, when communication of the network traffic is determined to not be permitted, the network traffic from being communicated via the network.

14. The network device of claim 8, wherein the one or more processors are further configured to log the policy rule associated with the application feature.

15. A non-transitory computer-readable medium storing instructions, the instructions comprising:
 one or more instructions that, when executed by one or more processors, cause the one or more processors to:
  monitor a session that is associated with a network;
  determine that network traffic of the session is associated with a dynamic application,
   wherein the one or more instructions, that determine that the network traffic of the session is associated with the dynamic application, cause the one or more processors to:
    identify an application identifier of an application associated with the network traffic, and
    determine, from a list of dynamic applications and based on identifying the application identifier, that the application is designated as the dynamic application;
  determine, based on determining that the network traffic of the session is associated with the dynamic application, that the network traffic of the session is associated with an application feature,
wherein the one or more instructions, that cause the one or more processors to determine that the network traffic of the session is associated with the application feature, cause the one or more processors to:
identify an application feature identifier associated with the network traffic, and
determine, from a list of application features and based on identifying the application feature identifier, that the network traffic is associated with the application feature;
determine, from a policy mapping and based on identifying at least one of the application identifier and the application feature identifier, a policy rule to apply to the network traffic,
wherein the policy rule indicates whether the network traffic is permitted to be communicated or is to be prevented from being communicated via the network, and
wherein the policy mapping includes a set of entries corresponding to the policy rule,
wherein the set of entries includes the application identifier and the application feature identifier;
determine, based on the policy rule, whether the network traffic is permitted to be communicated via the network; and
perform, based on whether the network traffic is determined to be permitted to be communicated, an action associated with communication of the network traffic.

16. The non-transitory computer-readable medium of claim 15, wherein the session is monitored based on analyzing payloads of communications of the session to identify one or more particular sets of communications,
wherein the application feature is associated with at least one of the one or more particular sets of communications.

17. The non-transitory computer-readable medium of claim 15, wherein the session is associated with the application, and
wherein the policy rule is determined based on identifying the application identifier and the application feature identifier.

18. The non-transitory computer-readable medium of claim 15, wherein the application feature is a first application feature, the network traffic is first network traffic of the session, the policy rule is a first policy rule that indicates that the first application feature is permitted, and the action comprises a first action that enables communication of the first network traffic via the network, and
wherein the one or more instructions, when executed by the one or more processors, further cause the one or more processors to:
determine that second network traffic is associated with a second application feature that is different from the first application feature;
determine that a second policy rule indicates that the second application feature is not permitted to be communicated via the network; and
perform, based on the second policy rule, a second action that prevents communication of the second network traffic via the network.

19. The non-transitory computer-readable medium of claim 15, wherein the session is a first session, the network traffic is first network traffic, the dynamic application is a first dynamic application, that is associated with a first application, the policy rule is first policy rule that indicates that the application feature is permitted for the first application, and the action comprises enabling communication of the first network traffic via the network, and
wherein the one or more instructions, when executed by the one or more processors, further cause the one or more processors to:
monitor a second session that is associated with a second dynamic application;
determine that second network traffic of the second session is associated with the application feature;
determine, from the policy mapping, a second policy rule that indicates that the application feature is not permitted to be communicated via the network for the second dynamic application; and
perform, based on the second policy rule, a second action that prevents communication of the second network traffic via the network.

20. The non-transitory computer-readable medium of claim 15, wherein the application feature is associated with one or more of:
chat traffic,
secure message traffic,
media stream traffic,
voice communication traffic,
media download traffic,
media upload traffic,
interactive traffic,
tunneled traffic, or
social media traffic.

* * * * *

UNITED STATES PATENT AND TRADEMARK OFFICE
CERTIFICATE OF CORRECTION

| | | |
|---|---|---|
| PATENT NO. | : 11,303,575 B2 | |
| APPLICATION NO. | : 16/829690 | |
| DATED | : April 12, 2022 | |
| INVENTOR(S) | : Rajeev Chaubey et al. | |

It is certified that error appears in the above-identified patent and that said Letters Patent is hereby corrected as shown below:

In the Claims

In Claim 15, Column 33, Line 15, "identifying at least one of the application identifier" should be changed to --identifying the application identifier--.

Signed and Sealed this
Thirty-first Day of May, 2022

*Katherine Kelly Vidal*

Katherine Kelly Vidal
*Director of the United States Patent and Trademark Office*